United States Patent
Fujita et al.

(10) Patent No.: US 7,881,400 B2
(45) Date of Patent: Feb. 1, 2011

(54) PULSE MODULATION TYPE TRANSMITTER APPARATUS AND PULSE MODULATION TYPE RECEIVER APPARATUS

(75) Inventors: Suguru Fujita, Tokyo (JP); Masahiro Mimura, Tokyo (JP); Kazuaki Takahashi, Tokyo (JP); Yoshinori Kunieda, Tokyo (JP); Noriyuki Ueki, Tokyo (JP)

(73) Assignee: Panasonic Corporation, Osaka (JP)

( * ) Notice: Subject to any disclaimer, the term of this patent is extended or adjusted under 35 U.S.C. 154(b) by 636 days.

(21) Appl. No.: 11/914,281

(22) PCT Filed: May 8, 2006

(86) PCT No.: PCT/JP2006/309258

§ 371 (c)(1),
(2), (4) Date: Nov. 13, 2007

(87) PCT Pub. No.: WO2006/121012

PCT Pub. Date: Nov. 16, 2006

(65) Prior Publication Data

US 2009/0041169 A1    Feb. 12, 2009

(30) Foreign Application Priority Data

May 13, 2005  (JP)  .............................. 2005-140935
Apr. 11, 2006  (JP)  .............................. 2006-109027

(51) Int. Cl.
*H04L 27/00* (2006.01)
(52) U.S. Cl. .................. 375/295; 375/146; 375/219; 375/354; 375/358
(58) Field of Classification Search ................. 375/146, 375/219, 295, 354, 358
See application file for complete search history.

(56) References Cited

U.S. PATENT DOCUMENTS 5,781,733 A * 7/1998 Stiles .......................... 709/215

(Continued)

FOREIGN PATENT DOCUMENTS

JP    2003-535552    11/2003

(Continued)

OTHER PUBLICATIONS

English Language Abstract of JP 2005-006291.

(Continued)

*Primary Examiner*—Ted M Wang
(74) *Attorney, Agent, or Firm*—Greenblum & Bernstein, P.L.C.

(57) ABSTRACT

A pulse modulation type transmitter apparatus and a pulse modulation type receiver apparatus wherein both a fast synchronization establishment and a low power consumption of a synchronizing part can be achieved at the same time and wherein the data transmission/reception can be performed soon after a commencement of communication, and further a fast data transmission and a low power consumption can be achieved. A first template signal (1006), which is generated based on a separately transmitted RF frame synchronization signal (1005), is used to generate a frame synchronization signal (1009), and a second frame synchronization timing adjusting part (150) is used to synchronize the frame synchronization signal (1009) with a received RF data signal (1004). Then, a synchronization detection is performed, whereby a prompt pulse acquisition and a prompt pulse phase acquisition can be achieved. After the establishment of frame synchronization, a template switching part (142) is used to switch from the first template signal (1006) to a second template signal (1007) that has been already synchronized with the first template signal (1006). Then, a synchronization detection is performed, whereby the frame synchronization can be maintained.

8 Claims, 12 Drawing Sheets

U.S. PATENT DOCUMENTS

| | | | |
|---|---|---|---|
| 6,970,448 B1 * | 11/2005 | Sparrell et al. | 370/347 |
| 7,551,681 B2 * | 6/2009 | Chan et al. | 375/267 |
| 2003/0161411 A1 | 8/2003 | McCorkle et al. | |
| 2004/0233889 A1 | 11/2004 | Fujita et al. | |
| 2005/0013392 A1 | 1/2005 | Mizugaki et al. | |

FOREIGN PATENT DOCUMENTS

| | | |
|---|---|---|
| JP | 2005-006291 | 1/2005 |
| JP | 2005-039392 | 2/2005 |
| WO | 01/93441 | 12/2001 |
| WO | 01/93442 | 12/2001 |

OTHER PUBLICATIONS

English Language Abstract of JP 2005-039392.

* cited by examiner

# PULSE MODULATION TYPE TRANSMITTER APPARATUS AND PULSE MODULATION TYPE RECEIVER APPARATUS

TECHNICAL FIELD

The present invention relates to a radio communication apparatus that uses a pulse-shaped modulated signal.

BACKGROUND ART

With the rapid proliferation of radio LAN apparatuses typified by IEEE802.11b apparatuses, a society is envisioned in which a seamless network is established through the mutual radio connection of audiovisual devices and/or personal computers, and the establishment of a technologies that realize small, high-speed data communication apparatuses inexpensively has become a matter of urgency.

Pulse radio communication using a pulse-shaped modulated signal has attracted attention as one such technology. As a conventional method of synchronizing a receive data signal in a pulse radio communication apparatus, a method is known whereby synchronization is performed by means of correlation between a reference time and preceding and succeeding signals for which delay processing is executed (see Patent Document 1, for example).

FIG. 12 is a block diagram showing the configuration of a conventional pulse radio communication apparatus described in Patent Document 1. In FIG. 12, a conventional pulse radio communication apparatus 1200 is composed of an amplifier 1202 that amplifies an RF signal received by an antenna 1201, a filter 1203 that eliminates an unwanted signal, an analog coding section 1204 that analogizes a signal, a splitter 1205 that splits a signal, a plurality of delay devices 1206, 1207, and 1208 that delay signals, a plurality of multipliers 1209, 1210, and 1211 that multiply signals, a plurality of integrators 1212, 1213, and 1214 that perform time integration, a reception synchronization control section 1217 that performs synchronization determination and delay control according to a correlation, a phase delay section 1218 that delays the phase of a signal, a main received wavelet code generator 1216 that modulates a phase-delayed signal and performs spreading with the same spreading code, and a splitter 1215 that splits main received wavelet code generator 1216 output into three, and outputs the three split signals to multipliers 1209, 1210, and 1211.

With this configuration, a received RF signal is amplified to an amplitude necessary for demodulation by amplifier 1202, an out-of-band unwanted frequency band is eliminated by filter 1203, and an analog signal is generated by analog coding section 1204. This signal is split by splitter 1205, and three delayed signals—namely, a signal delayed by time L, a signal delayed by time L+Y, and a signal delayed by time L−Y—are output by delay devices 1206, 1207, and 1208. These three signals are multiplied by multipliers 1209, 1210, and 1211 respectively by a reference pulse signal generated by main received wavelet code generator 1216, and undergo time integration corresponding to the respective symbols by integrators 1212, 1213, and 1214. Synchronization is determined and phase delay section 1218 is controlled by reception synchronization control section 1217 according to the correlations of the signals, and decoded data 1219 is output while sliding synchronization is performed. At this time, adjustment is performed to synchronize with the transmit data signal by having the tracking cycle delayed by phase delay section 1218 if the correlation of the time L+Y signal is higher than that of the time L signal, taking the time L reception path signal as a correlation reference, and conversely, having the tracking cycle advanced by phase delay section 1218 if the correlation of the time L−Y signal is higher. Patent Document 1: National Publication of International Patent Application No. 2003-535552 (paragraph 148, FIG. 27).

DISCLOSURE OF INVENTION

Problems to be Solved by the Invention

However, with a conventional pulse radio communication apparatus and synchronization method thereof whereby, each time communication is performed, synchronization is established by achieving waveform correlation based on a synchronization frame in a received signal, after which data demodulation is performed, the time needed to establish synchronization is long, and therefore not only does the transmission speed of actual information decrease, but there is also a problem of a state arising in which the correlated pulse level is high due to interference waves such as a multipath wave or a radio wave from another apparatus, with resulting faulty synchronization.

In order to solve these problems, configurations have been proposed whereby the correlated pulse level is determined in stages, or, as shown in the prior art (FIG. 12), interference waves are eliminated through the use of a plurality of reception systems, but these solutions involve such problems as a more complicated determination process, a larger apparatus configuration, increased power consumption, and a more expensive apparatus.

The present invention has been implemented taking into account the problems described above, and it is an object of the present invention to provide a pulse modulation type transmitting apparatus and pulse modulation type receiving apparatus that shorten the time required for synchronization establishment, and make possible high-speed data transmission in which data exchange can be performed immediately after the start of communication, by having the receiving apparatus switch the synchronization method as appropriate according to the synchronization state. It is a further object of the present invention to provide a low-power-consumption pulse modulation type transmitting apparatus, pulse modulation type receiving apparatus, and system, despite the use of a configuration having a plurality of reception systems, by having the receiving apparatus switch the synchronization method as appropriate according to the synchronization state.

Means for Solving the Problems

A pulse modulation type receiving apparatus of the present invention includes a frame synchronization section that receives a first RF input signal that is a receive RF data signal and a second RF input signal having a first template signal used in generation of a frame synchronization signal of the first RF input signal, and outputs a frame-synchronized receive data signal using the first RF input signal and second RF input signal; and employs a configuration in which the frame synchronization section includes a first frame synchronization timing adjustment section that extracts the first template signal from the second RF input signal, a template signal generation section that outputs a second template signal used in generation of the frame synchronization signal, synchronized with the first template signal, a template signal switching section that, when the first RF input signal and second RF input signal are input to the frame synchronization section, selects the first template signal, and switches output from the first template signal to the second template signal according to the frame synchronization state, a frame synchronization signal generation section that generates the frame synchronization signal using the first or second template signal output from the template signal switching section, and a second frame synchronization timing adjustment section that synchronizes the frame synchronization signal with the first RF input signal and outputs the receive data signal; the second frame synchronization timing adjustment section includes a frame synchronization correlation determination section that, when the correlation value between the first RF input signal and the frame synchronization signal reaches a predetermined value, outputs a template switching directive signal to the template signal switching section; and the template signal switching section receives the template switching signal and performs a switching operation from the first template signal to the second template signal.

According to the above-described configuration, at the start of input when a first RF input signal that is a receive RF data signal and a second RF input signal having a template signal for generating a frame synchronization signal are input to the frame synchronization section, the frame synchronization section selects a frame synchronization signal that uses the first template signal possessed by the second RF input signal by means of the frame synchronization signal switching section.

Then first RF input signal synchronization is accomplished by the second frame synchronization timing adjustment section using the frame synchronization signal.

Also, while synchronization between the first RF input signal and the frame synchronization signal using the first template signal is established, the template signal generation section performs an operation to synchronize the second template signal generated in the template signal generation section with the first template signal. Then the frame synchronization correlation determination section in the second frame synchronization timing adjustment section detects the correlation between the first RF input signal and the frame synchronization signal, and when the correlation value reaches a predetermined value, sends a frame synchronization signal switching directive signal to the frame synchronization signal switching section.

Furthermore, the frame synchronization signal switching section performs an input switching operation from the first template signal to the second template signal by means of the frame synchronization signal switching directive signal.

Moreover, the second frame synchronization timing adjustment section synchronizes the frame synchronization signal using the second template signal with the first RF input signal, and outputs a decoded data signal.

By this means, the time required for frame synchronization establishment can be shortened by performing a frame synchronization establishment operation by switching from a frame synchronization signal using the first template signal to a frame synchronization signal using the second template signal according to the frame synchronization state. Also, shortening the time required for frame synchronization establishment enables more data to be received, making it possible to perform high-speed data transmission.

Also, a pulse modulation type receiving apparatus of the present invention employs a configuration in which the frame synchronization state includes: a first state that is a pulse acquisition state in which the first RF input signal and second RF input signal are input to the frame synchronization section, and the second frame synchronization timing adjustment section detects the presence or absence of an RF data pulse composing the first RF input signal and accomplishes synchronization; and a second state that is a pulse phase acquisition state in which the second frame synchronization timing adjustment section performs establishment of synchronization of a previously defined phase level of the RF data pulse; and the frame synchronization correlation determination section, when the correlation value between the first RF input signal and the frame synchronization signal reaches the predetermined value, determines that a transition should be made from the first state to the second state and sends the template switching directive signal to the template switching section, and in the first state outputs a received signal using the first template signal, and in the second state outputs a received signal using the second template signal.

According to the above-described configuration, the frame synchronization section can perform coherent detection using the first template signal in the pulse acquisition state, and coherent detection using the second template signal in the pulse phase acquisition state, and can shorten the time required for frame synchronization establishment. Also, shortening the time required for frame synchronization establishment enables more data to be received, making it possible to perform high-speed data transmission.

Also, a pulse modulation type receiving apparatus of the present invention employs a configuration in which a second RF input signal is transmitted in a different frequency band from a first RF input signal.

According to the above-described configuration, the frame synchronization section can extract a first template signal little affected by the first RF input signal from the second RF input signal transmitted in a different frequency band from the first RF input signal, can achieve establishment of frame synchronization using the first template signal little affected by the first RF input signal, and can shorten the time required for frame synchronization establishment. Also, shortening the time required for frame synchronization establishment enables more data to be received, making it possible to perform high-speed data transmission.

Also, a template signal switching section in a pulse modulation type receiving apparatus of the present invention employs a configuration in which, when a template switching signal is received and a switching operation is performed from a first template signal to a second template signal, the power supply to the first frame synchronization timing adjustment section is stopped.

According to the above-described configuration, the frame synchronization section can achieve lower power consumption of the pulse modulation type receiving apparatus by stopping the power supplied to the first frame synchronization timing adjustment section, in a previously defined part or the entirety of the first symbol synchronization timing adjustment section, after the template signal switching section receives a template switching signal and performs a switching operation from the first template signal to the second template signal.

Also, a pulse modulation type receiving apparatus of the present invention employs a configuration in which, after the power supply to the first frame synchronization timing adjustment section is stopped, when a second RF input signal is input again, or when an RF frame synchronization maintenance signal for performing synchronization drift correction is input from a communicating party at a predetermined interval, the power supply to the first frame synchronization timing adjustment section is restarted.

According to the above-described configuration, until an RF frame synchronization signal or an RF frame synchronization maintenance signal received at a predetermined time interval arrives, the symbol synchronization section of the pulse modulation type receiving apparatus can achieve lower power consumption of the pulse modulation type receiving apparatus by stopping the power supplied to the first frame synchronization timing adjustment section, in a previously defined part or the entirety of the first frame synchronization timing adjustment section. Also, after a predetermined time has elapsed, frame synchronization maintenance can be achieved after frame synchronization has been established using a successively received RF frame synchronization signal or an RF frame synchronization maintenance signal received at a predetermined time interval, and the time required for frame synchronization re-establishment for frame synchronization maintenance can be shortened.

Also, a pulse modulation type receiving apparatus of the present invention has a configuration that further has a symbol synchronization section that receives the receive data signal and an RF symbol synchronization timing signal having a first timing signal used in symbol synchronization signal generation, and outputs a decoded data signal; wherein the symbol synchronization section includes a first symbol synchronization timing adjustment section that extracts the first timing signal from the RF symbol synchronization timing signal, a clock regeneration section that outputs a second timing signal synchronized with the first timing signal, a timing signal switching section that, when input of the receive data signal and the RF symbol synchronization timing signal to the symbol synchronization section is started, selects the first timing signal, and switches output from the first timing signal to the second timing signal according to the symbol synchronization state, a symbol generation section that generates the RF symbol synchronization signal using the first or second timing signal output from the timing signal switching section, and a second symbol synchronization timing adjustment section that synchronizes the symbol synchronization signal with the receive data signal and outputs the decoded data signal; the second symbol synchronization timing adjustment section includes a symbol synchronization correlation determination section that, when the correlation value between the receive data signal and the symbol synchronization signal reaches a predetermined value, outputs a timing switching directive signal to the timing signal switching section; and the timing signal switching section receives the timing switching directive signal and performs a switching operation from the first timing signal to the second timing signal.

According to the above-described configuration, at the start of input when a correlation receive data signal and an RF symbol synchronization timing signal are input to the symbol synchronization section, the timing signal switching section selects a first timing signal possessed by the RF symbol synchronization timing signal.

The symbol generation section then generates a symbol synchronization signal based on the first timing signal. Then the second symbol synchronization timing adjustment section accomplishes correlation receive data signal synchronization using the symbol synchronization signal. Also, while synchronization between the correlation receive data signal and the symbol synchronization signal is established, the clock regeneration performs section an operation to synchronize the second timing signal generated in the clock regeneration section with the first timing signal.

Then the symbol synchronization correlation determination section in the second symbol synchronization timing adjustment section detects the correlation between the correlation receive data signal and symbol synchronization signal, and when the correlation value reaches a predetermined value, sends a timing switching directive signal to the timing signal switching section.

Furthermore, the timing signal switching section performs an input switching operation from the first timing signal to the second timing signal by means of the timing switching directive signal.

Moreover, the second symbol synchronization timing adjustment section synchronizes the symbol synchronization signal using the second timing signal with the correlation receive data signal, and outputs a decoded data signal.

By this means, the timing signal switching section can perform a frame synchronization establishment operation by switching from the first timing signal to the second timing signal according to the symbol synchronization state, and can shorten the time required for symbol synchronization establishment.

Also, shortening the time required for symbol synchronization establishment enables more data to be received, making it possible to perform high-speed data transmission.

Also, a pulse modulation type receiving apparatus of the present invention employs a configuration in which, when a timing signal switching section receives a timing switching directive signal and performs a switching operation from a first timing signal to a second timing signal, the power supply to the first symbol synchronization timing adjustment section is stopped.

According to the above-described configuration, the symbol synchronization section can achieve lower power consumption of the pulse modulation type receiving apparatus by stopping the power supplied to the first symbol synchronization timing adjustment section, in a previously defined part or the entirety of the first symbol synchronization timing adjustment section, after the timing signal switching section receives a timing switching signal and performs a switching operation from the first timing signal to the second timing signal.

Also, a pulse modulation type receiving apparatus of the present invention employs a configuration in which, after the power supply to the first symbol synchronization timing adjustment section is stopped, when an RF symbol synchronization timing signal is input again, or when an RF symbol synchronization timing maintenance signal is input from a communicating party at a predetermined time interval, the power supply to the first symbol synchronization timing adjustment section is restarted.

According to the above-described configuration, until an RF symbol synchronization timing signal or an RF symbol synchronization timing maintenance signal received at a predetermined time interval arrives, the symbol synchronization section can achieve lower power consumption of the pulse modulation type receiving apparatus by stopping the power supplied to the first symbol synchronization timing adjustment section, in a previously defined part or the entirety of the first symbol synchronization timing adjustment section. Also, after a predetermined time has elapsed, symbol synchronization maintenance can be achieved after symbol synchronization has been established using a successively received RF symbol synchronization timing signal or an RF symbol synchronization timing maintenance signal received at a predetermined time interval, and the time required for synchronization re-establishment for symbol synchronization maintenance can be shortened.

Also, a pulse modulation type receiving apparatus of the present invention includes a frame synchronization section that receives a first RF input signal that is a receive RF data signal and a second RF input signal having a template signal used in generation of a frame synchronization signal of the first RF input signal, and outputs a frame-synchronized receive data signal using the first RF and second RF input signals; and employs a configuration in which the frame synchronization section includes a first frame synchronization timing adjustment section that extracts the template signal from the second RF input signal, a frame synchronization signal generation section that generates a frame synchronization signal based on the template signal, a variable delay section that outputs a delayed receive RF data signal resulting from delaying the first RF input signal by a predetermined time, a frame synchronization signal switching section that, when input of the first RF input signal and second RF input signal to the frame synchronization section is started, selects the frame synchronization signal, and switches output from the frame synchronization signal to the delayed receive RF data signal according to the frame synchronization state, and a second frame synchronization timing adjustment section that synchronizes the frame synchronization signal or delayed receive RF data signal output from the frame synchronization signal switching section with the first RF input signal and outputs the receive data signal; the second frame synchronization timing adjustment section includes a frame synchronization correlation determination section that, when the correlation value between the first RF input signal and the frame synchronization signal output from the frame synchronization signal switching section reaches a predetermined value, outputs a frame synchronization signal switching directive signal to the frame synchronization signal switching section; and the frame synchronization signal switching section receives the frame synchronization signal switching directive signal and performs a switching operation from the frame synchronization signal to the delayed receive RF data signal.

According to the above-described configuration, at the start of input when a first RF input signal that is a receive RF data signal and a second RF input signal having a template signal for generating a frame synchronization signal are input to the frame synchronization section, the frame synchronization signal switching section selects a frame synchronization signal that uses the template signal possessed by the second RF input signal.

Then the second frame synchronization timing adjustment section accomplishes first RF input signal synchronization using the frame synchronization signal. The frame synchronization correlation determination section in the second frame synchronization timing adjustment section then detects the correlation between the first RF input signal and frame synchronization signal, and when the correlation value reaches a predetermined value, sends a frame synchronization signal switching directive signal to the frame synchronization signal switching section.

Furthermore, the frame synchronization signal switching section performs an input switching operation from the frame synchronization signal using the template signal possessed by the second RF input signal to the delayed receive RF data signal by means of the frame synchronization signal switching directive signal. Moreover, the second frame synchronization timing adjustment section synchronizes the delayed receive RF data signal with the first RF input signal, and outputs a decoded data signal.

By this means, a frame synchronization establishment operation can be performed by switching from the frame synchronization signal using a template signal to the delayed receive RF data signal according to the frame synchronization state, and the time required for frame synchronization establishment can be shortened. Also, shortening the time required for frame synchronization establishment enables more data to be received, making it possible to perform high-speed data transmission.

Also, a pulse modulation type receiving apparatus of the present invention employs a configuration in which the frame synchronization state includes: a first state that is a pulse acquisition state in which the first RF input signal and second RF input signal are input to the frame synchronization section, and the second frame synchronization timing adjustment section detects the presence or absence of an RF data pulse composing the first RF input signal and accomplishes synchronization; and a second state that is a pulse phase acquisition state in which the second frame synchronization timing adjustment section performs establishment of synchronization of a previously defined phase level of the RF data pulse; and the frame synchronization correlation determination section, when the correlation value between the first RF input signal and the frame synchronization signal reaches the predetermined value, determines that a transition should be made from the first state to the second state and sends the template switching directive signal to the template switching section, and in the first state outputs a received signal using the template signal, and in the second state outputs a received signal using the first RF input signal.

According to the above-described configuration, the frame synchronization section can perform coherent detection using the template signal in the pulse acquisition state, and coherent detection using the first RF input signal in the pulse phase acquisition state, and can shorten the time required for frame synchronization establishment. Also, shortening the time required for frame synchronization establishment enables more data to be received, making it possible to perform high-speed data transmission.

Also, a pulse modulation type receiving apparatus of the present invention employs a configuration in which, when the frame synchronization signal switching section performs switching from a frame synchronization signal to a delayed receive RF data signal, the first frame synchronization timing adjustment section stops operating.

According to the above-described configuration, the frame synchronization section can achieve lower power consumption of a pulse modulation type transmitting apparatus by stopping the power supplied to the first frame synchronization timing adjustment section, in a previously defined part or the entirety of the first frame synchronization timing adjustment section, after the frame synchronization signal switching section receives a frame synchronization signal switching signal and performs a switching operation from the frame synchronization signal to the delayed receive RF data signal.

Also, the frame synchronization section of a pulse modulation type receiving apparatus of the present invention employs a configuration in which low-precision synchronization is performed with the second RF input signal and high-precision synchronization is performed with the first RF input signal.

According to the above-described configuration, the power consumption of the synchronization circuitry can be reduced by, for example, performing low-rate synchronization in a low-rate communication system or communication method, and performing high-precision synchronization in a high-rate communication system or communication method as necessary, and the time from the start of high-precision synchronization until synchronization establishment can be shortened by performing low-rate synchronization at fixed time intervals.

Also, a pulse modulation type transmitting apparatus of the present invention employs a configuration that includes: a symbolization section that executes predetermined symbolization for transmit data, a frame synchronization signal, and a symbol synchronization timing signal, and generates symbolized transmit data, a symbolized frame synchronization signal, and a symbolized symbol synchronization timing signal; an RF data signal transmitting section that executes predetermined modulation on symbolized transmit data, performs up-conversion to radio frequency, and generates an RF data signal having a first RF input signal that is input to the frame synchronization section of a communicating party; and an RF synchronization signal transmitting section that executes predetermined modulation on the symbolized frame synchronization signal, performs up-conversion to radio frequency, and generates an RF frame synchronization signal having a second RF input signal that is input to the frame synchronization section of the communicating party, and executes predetermined modulation on the symbolized symbol synchronization timing signal, performs up-conversion to radio frequency, and generates an RF symbol synchronization timing signal that is input to the symbol synchronization section of the communicating party.

According to the above-described configuration, the RF data signal transmitting section can execute predetermined modulation and up-conversion to radio frequency after executing predetermined symbolization on transmit data, and generate an RF data signal having a first RF input signal that should be input to the frame synchronization section of a communicating-party pulse modulation type receiving apparatus. Also, the RF synchronization signal transmitting section can execute predetermined modulation and up-conversion to radio frequency after executing predetermined symbolization on a frame synchronization signal, and generate an RF frame synchronization signal having a second RF input signal that is input to the frame synchronization section of the communicating-party pulse modulation type receiving apparatus, and can execute predetermined modulation and up-conversion to radio frequency after executing predetermined symbolization on a symbol synchronization timing signal, and generate an RF symbol synchronization timing signal that is input to the symbol synchronization section of the communicating-party pulse modulation type receiving apparatus. Then the time required for frame synchronization establishment and symbol synchronization establishment by the pulse modulation type receiving apparatus can be shortened by sending the RF data signal, RF frame synchronization signal, and RF symbol synchronization timing signal having the transmit data, frame synchronization signal, and symbol synchronization timing signal to the communicating-party pulse modulation type receiving apparatus.

Also, the RF synchronization signal transmitting section of a pulse modulation type transmitting apparatus of the present invention employs a configuration in which an RF symbol synchronization timing signal is sent in a different frequency band from an RF frame synchronization signal.

According to the above-described configuration, the pulse modulation type transmitting apparatus can send an RF symbol synchronization timing signal and an RF frame synchronization signal in different frequency bands having little mutual effect, symbol synchronization and frame synchronization can be achieved by the communicating-party pulse modulation type receiving apparatus based on an RF symbol synchronization timing signal and an RF frame synchronization signal having little mutual effect, and the time required for frame synchronization establishment and symbol synchronization establishment can be shortened. Also, shortening the time required for frame synchronization establishment and symbol synchronization establishment enables more data to be transmitted, making it possible to perform high-speed data transmission.

Also, the RF synchronization signal transmitting section of a pulse modulation type transmitting apparatus of the present invention has a configuration in which an RF frame synchronization maintenance signal and an RF symbol synchronization timing maintenance signal are sent at a previously defined time interval.

According to the above-described configuration, the pulse modulation type transmitting apparatus can send an RF frame synchronization maintenance signal and an RF symbol synchronization timing maintenance signal at a predetermined time interval, and lower power consumption of the pulse modulation type transmitting apparatus can be achieved by stopping the power supplied to the RF synchronization signal transmitting section, in a previously defined part or the entirety of the RF synchronization signal transmitting section, while an RF frame synchronization maintenance signal and RF symbol synchronization timing maintenance signal are not being sent.

Also, the RF data signal transmitting section and RF synchronization signal transmitting section of a pulse modulation type transmitting apparatus of the present invention employ configurations that further include a waveform selection section that assigns wavelets having mutually separable signal waveforms to an RF data signal, an RF frame synchronization signal, an RF symbol synchronization timing signal, an RF frame synchronization maintenance signal, and an RF symbol synchronization timing maintenance signal.

According to the above-described configuration, since wavelets having mutually separable signal waveforms can be transmitted in the same frequency band, it is possible to transmit an RF frame synchronization signal, RF symbol synchronization timing signal, RF frame synchronization maintenance signal, and RF symbol synchronization timing maintenance signal, which are separately sent signals other than data signals, in the same frequency band as a data signal or another separately sent signal. By this means, a data signal can also be transmitted using a frequency band that should be provided for each separately sent signal, thereby enabling improved frequency utilization efficiency to be achieved, and as a result making it possible to perform high-speed data transmission.

Also, the waveform selection section of a pulse modulation type transmitting apparatus of the present invention has a configuration in which different wavelets are used for one or more signals among an RF frame synchronization signal, an RF symbol synchronization timing signal, an RF frame synchronization maintenance signal, and an RF symbol synchronization timing maintenance signal.

According to the above-described configuration, since wavelets having mutually separable signal waveforms can be transmitted in the same frequency band, it is possible to transmit an RF frame synchronization signal, RF symbol synchronization timing signal, RF frame synchronization maintenance signal, and RF symbol synchronization timing maintenance signal, which are separately sent signals other than data signals, in the same frequency band as a data signal or another separately sent signal. By this means, a data signal can also be transmitted using a frequency band that should be provided for each separately sent signal, thereby enabling improved frequency utilization efficiency to be achieved, and as a result making it possible to perform high-speed data transmission.

Also, the RF frame synchronization signal of a pulse modulation type transmitting apparatus of the present invention may include data for device authentication.

According to the above-described configuration, performing authentication by means of a separately sent signal makes an authentication data part unnecessary in a communication data signal, and enables lowering of the data rate to be avoided.

Also, with a pulse modulation type transmitting apparatus of the present invention, data rates of at least two of the RF data signal, the RF frame synchronization signal, and the RF symbol synchronization timing signal may differ.

According to the above-described configuration, varying the data rates of the signals makes it possible to narrow the band occupied by a low-rate signal, and reduce the frequency band used. This case also includes coordinated operation with another low-rate type of pulse communication.

Also, the RF data signal transmitting section and RF synchronization signal transmitting section of a pulse modulation type transmitting apparatus of the present invention have configurations that transmit at least one of the RF data signal, the RF frame synchronization signal, and the RF symbol synchronization timing signal.

According to the above-described configuration, coordinated operation such as communication collision prevention can be performed with another device within the same system, or a device of another system, by transmitting only a specific-use signal.

ADVANTAGEOUS EFFECT OF THE INVENTION

The present invention can provide a pulse modulation type transmitting apparatus and pulse modulation type receiving apparatus that have an effect of shortening the time required for synchronization establishment, and enabling data exchange to be performed immediately after the start of communication, making high-speed data transmission possible. Also, the present invention can provide a pulse modulation type transmitting apparatus, pulse modulation type receiving apparatus, and system that have an effect of achieving low synchronization section power consumption despite the use of a configuration having a plurality of reception systems.

BEST MODE FOR CARRYING OUT THE INVENTION

Embodiments of the present invention will now be described with reference to the accompanying drawings.

Embodiment 1

First, a pulse modulation type transmitting apparatus and pulse modulation type receiving apparatus according to this embodiment will be described. A pulse modulation type transmitting apparatus and pulse modulation type receiving apparatus according to this embodiment are configured as a pulse modulation type transmitting apparatus that executes predetermined modulation on a transmit data signal and frame synchronization signal, and sends a radio signal up-converted to radio frequency to a communicating party, and a pulse modulation type receiving apparatus that receives that radio signal up-converted to radio frequency, and demodulates the transmit data.

Figure 1:
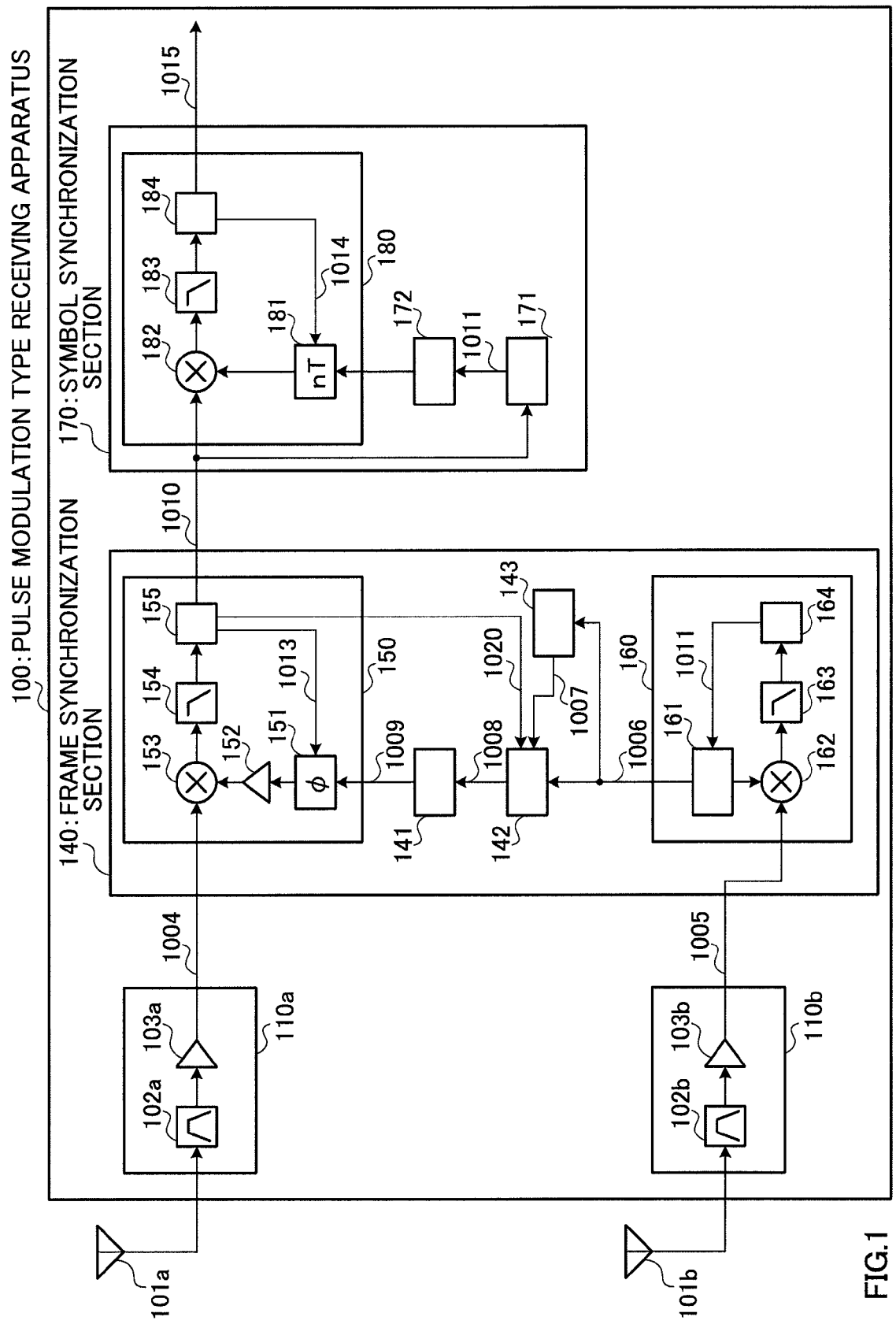
FIG. 1 is a block diagram showing the configuration of a pulse modulation type receiving apparatus according to Embodiment 1 of the present invention.
Figure 2:
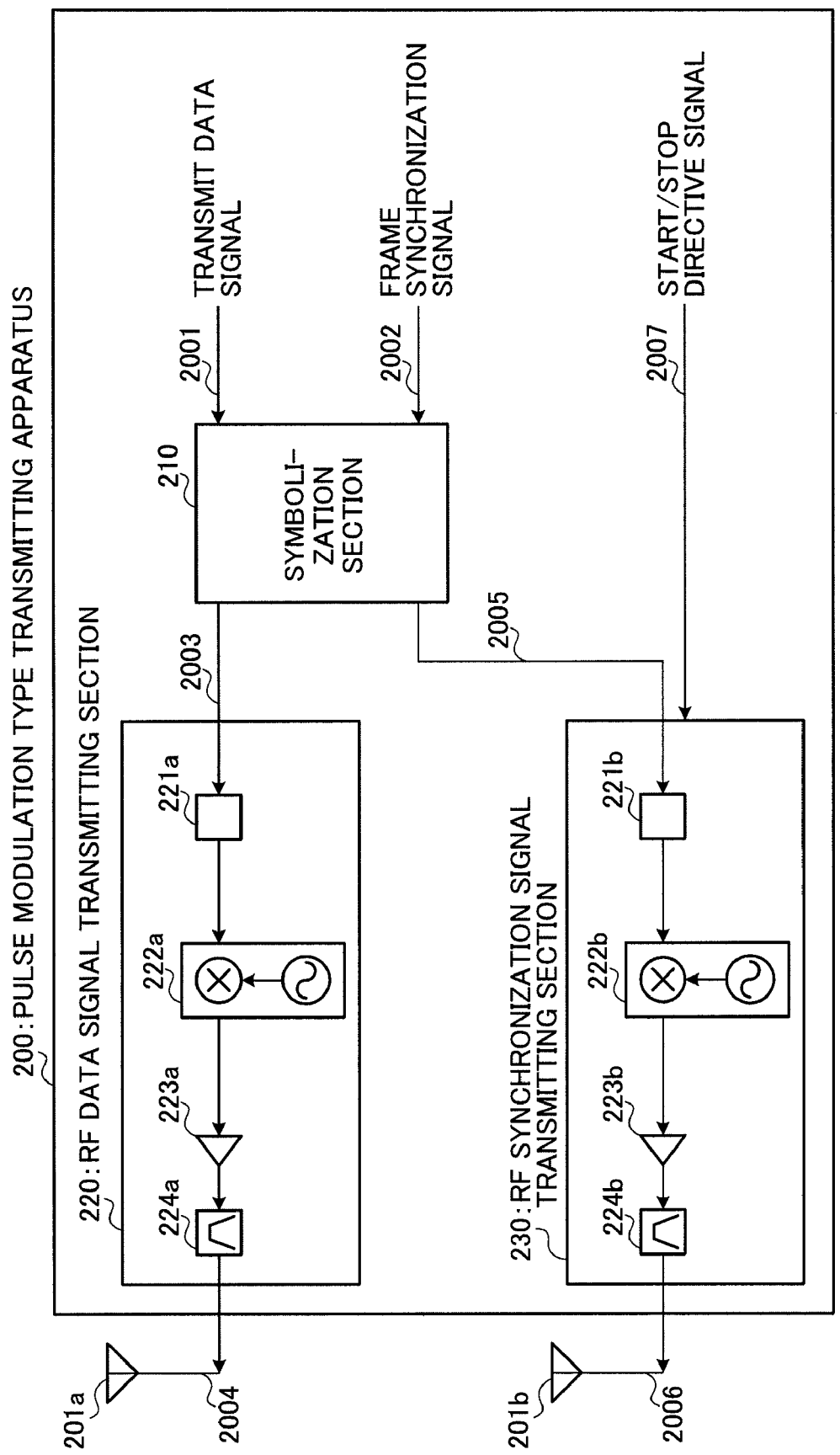
FIG. 2 is a block diagram showing the configuration of a pulse modulation type transmitting apparatus according to Embodiment 1 of the present invention.

FIG. 1 is a block diagram relating to synchronous operation of a pulse modulation type receiving apparatus in Embodiment 1 of the present invention, and FIG. 2 is a block diagram relating to a transmit data and frame synchronization signal transmission operation of a pulse modulation type transmitting apparatus in Embodiment 1 of the present invention.

In FIG. 1, a pulse modulation type receiving apparatus 100 is connected to two antennas 101a and 101b that receive radio signals, and is composed of a receiving section 110a, a receiving section 110b, a frame synchronization section 140, and a symbol synchronization section 170.

Here, receiving section 110a extracts a frequency component containing a data signal (hereinafter referred to as an RF data signal) from a radio signal, and amplifies that extracted signal, and receiving section 110b extracts a frequency component having a first template signal for generating a frame synchronization signal (hereinafter referred to as a separately sent RF synchronization signal) from a radio signal, and amplifies that extracted signal.

Frame synchronization section 140 receives a receive RF data signal 1004 and an RF frame synchronization signal 1005 having a first template signal for generating a frame synchronization signal, and outputs a correlation receive data signal 1010 that is a correlation between receive RF data signal 1004 and a frame synchronization signal 1009 described later herein.

Symbol synchronization section 170 extracts a decoded data signal 1015 by performing correlation between a symbol synchronization signal 112, generated by a symbol synchronization signal generation section 172 using an internal generation timing signal generated based on correlation receive data signal 1010, and correlation receive data signal 1010, and outputs decoded data signal 1015 to a later-stage signal processing section (not shown).

In receiving section 110a, a radio signal received by antenna 101a is input to a band-pass filter 102a that eliminates noise components other than a frequency band containing an RF data signal. Also, in receiving section 110a, an RF data signal from which noise has been eliminated is input to an amplifier 103a that amplifies the RF data signal to a desired output level with low noise, and outputs that signal.

In receiving section 110b, a radio signal received by antenna 101b is input to a band-pass filter 102b that eliminates noise components other than a frequency band containing an RF synchronization signal. Also, in receiving section 110b, an RF synchronization signal from which noise has been eliminated is input to an amplifier 103b that amplifies a separately sent RF synchronization signal component to a desired output level with low noise, and outputs that signal component.

Frame synchronization section 140 has a first frame synchronization timing adjustment section 160 that generates a first template signal 1006, a second template signal generation section 143 that generates a second template signal 1007 synchronized with first template signal 1006, and a template signal switching section 142 that selects first template signal 1006 at the start of input when receive RF data signal 1004 and RF frame synchronization signal 1005 are input to frame synchronization section 140, and switches output from first template signal 1006 to second template signal 1007 according to the synchronization state. Frame synchronization section 140 also has a frame synchronization signal generation section 141 that generates frame synchronization signal 1009 for synchronizing receive RF data signal 1004 based on a synchronization template signal 1008 (first template signal 1006 or second template signal 1007) output from template signal switching section 142, and a second frame synchronization timing adjustment section 150 that synchronizes receive RF data signal 1004 with frame synchronization signal 1009.

A first template signal generation section 161 of first frame synchronization timing adjustment section 160 generates a carrier of the same frequency as the separately sent RF frame synchronization signal and a first template signal, and also generates a modulated signal in which this carrier is modulated by first template signal 1006. Also, using a correlation section 162, a low-pass filter 163, and a correlation determination unit 164, first template signal generation section 161 synchronizes the above modulated signal with separately sent RF frame synchronization signal 1005 by performing feedback control so that the output of power supply 164 becomes a predetermined value. Furthermore, first template signal generation section 161 outputs template signal 1006 having a rising waveform synchronized with the rise timing of the first template signal of separately sent RF frame synchronization signal 1005

Second template signal generation section 143 outputs internally generated second template signal 1007, synchronized with input first template signal 1006.

Template signal switching section 142 receives a template switching signal 1020 from a frame synchronization correlation determination unit 155, and selects output by switching between first template signal 1006 and second template signal 1007.

Frame synchronization signal generation section 141 receives first template signal 1006 or second template signal 1007, generates a carrier of the same frequency as receive RF data signal 1004, and outputs this carrier as frame synchronization signal 1009 modulated by first template signal 1006 or second template signal 1007.

Frame synchronization signal 1009 is input to second frame synchronization timing adjustment section 150. A variable delay section 151 of second frame synchronization timing adjustment section 150 delays frame synchronization signal 1009 by a predetermined initial time φ, after which frame synchronization signal 1009 is amplified to a predetermined power level by an amplifier 152. Second frame synchronization timing adjustment section 150 uses a correlation section 153, a low-pass filter 154, and a frame synchronization correlation determination unit 155, and when synchronization starts and the output of frame synchronization correlation determination unit 155 reaches a first predetermined value, sends template switching signal 1020 to template signal switching section 142. Then second frame synchronization timing adjustment section 150 establishes synchronization of frame synchronization signal 1009 with receive RF data signal 1004 by performing feedback control of the amount of delay of variable delay section 151 by means of a control signal 1013 so that the output of frame synchronization correlation determination unit 155 becomes a second predetermined value.

Here, for the first or second predetermined value, the synchronization state can be divided into two states. These are a pulse acquisition state in which the presence or absence of an RF data pulse composing receive RF data signal 1004 is detected and synchronization is accomplished, and a pulse phase acquisition state in which synchronization establishment of the phase level of a wave element forming an RF data pulse is performed.

From the above, frame synchronization correlation determination unit 155 output in a state that can be adequately confirmed to be a pulse acquisition state is taken as a first predetermined value, and frame synchronization correlation determination unit 155 output in a state that can be adequately confirmed to be a pulse phase acquisition state is called a second predetermined value.

Symbol synchronization section 170 has a timing regeneration section 171 that generates an internal generation timing signal 1011 based on correlation receive data signal 1010, a symbol synchronization signal generation section 172 that generates a symbol synchronization signal 1012 based on internal generation timing signal 1011, and a first symbol synchronization timing adjustment section 180 that synchronizes symbol synchronization signal 1012 with correlation receive data signal 1010, restores and outputs decoded data signal 1015, and also performs timing adjustment internally so that the output becomes the desired decoded data signal.

Based on correlation receive data signal 1010, timing regeneration section 171 generates internal generation timing signal 1011 that has a rising waveform synchronized with the rise timing of the correlation receive data signal, and has a predetermined repeat cycle.

Symbol synchronization signal generation section 172 executes despreading on correlation receive data signal 1010 based on internal generation timing signal 1011, and generates and outputs symbol synchronization signal 1012 for restoring decoded data signal 1015.

First symbol synchronization timing adjustment section 180 has a variable delay section 181, a correlation section 182, a low-pass filter 183, and a symbol synchronization correlation determination unit 184. Variable delay section 181 delays symbol synchronization signal 1012 input by a predetermined initial time n×T (where n is an integer). Using correlation section 182, low-pass filter 183, and symbol synchronization correlation determination unit 184, first symbol synchronization timing adjustment section 180 synchronizes symbol synchronization signal 1012 with correlation receive data signal 1010 by performing feedback control of the amount of delay by means of a control signal 1014 so that the output of symbol synchronization correlation determination unit 184 becomes a predetermined value.

In pulse modulation type receiving apparatus 100 with the above configuration, receiving section 110a extracts receive RF data signal 1004, and receiving section 110b extracts RF frame synchronization signal 1005, from a radio signal received by two antennas 101a and 101b that receive a radio signal. Extracted receive RF data signal 1004 and RF frame synchronization signal 1005 are both input to frame synchronization section 140. First frame synchronization timing adjustment section 160 receives RF frame synchronization signal 1005 and outputs first template signal 1006.

Then, at the start of input whereby receive RF data signal 1004 and RF frame synchronization signal 1005 are input to frame synchronization section 140, template signal switching section 142 selects first template signal 1006, and outputs first template signal 1006 to frame synchronization signal generation section 141 as synchronization template signal 1008. Frame synchronization signal generation section 141 receives synchronization template signal 1008 and generates frame synchronization signal 1009, and outputs frame synchronization signal 1009 to second frame synchronization timing adjustment section 150.

Second frame synchronization timing adjustment section 150 accomplishes synchronization of frame synchronization signal 1009 with respect to receive RF data signal 1004 and finds the correlation with frame synchronization signal 1009, and when the output of frame synchronization correlation determination unit 155 reaches a first predetermined value, sends template switching signal 1020 to template signal switching section 142. During this time, second template signal generation section 143 synchronizes internally generated second template signal 1007 with first template signal 1006.

Template signal switching section 142 receives template switching signal 1020, and performs input switching from first template signal 1006 to second template signal 1007. Template signal switching section 142 outputs input-switched second template signal 1007 to frame synchronization signal generation section 141 as synchronization template signal 1008.

Frame synchronization signal generation section 141 receives synchronization template signal 1008 and generates frame synchronization signal 1009, and outputs frame synchronization signal 1009 to second frame synchronization timing adjustment section 150. Second frame synchronization timing adjustment section 150 performs correlation with frame synchronization signal 1009 while accomplishing synchronization of frame synchronization signal 1009 with respect to receive RF data signal 1004. Also, second frame synchronization timing adjustment section 150 outputs control signal 1013 to variable delay section 151 until the output of frame synchronization correlation determination unit 155 reaches a second predetermined value.

When the output of frame synchronization correlation determination unit 155 reaches the second predetermined value, synchronization of frame synchronization signal 1009 with respect to receive RF data signal 1004 is established, and predetermined correlation receive data signal 1010 is output from frame synchronization correlation determination unit 155.

Next, the configuration of a pulse modulation type transmitting apparatus will be described. In FIG. 2, a pulse modulation type transmitting apparatus 200 has a symbolization section 210 that performs a predetermined pulse signal sequence conversion operation (hereinafter referred to as symbolization) on a transmit data signal 2001 and a frame synchronization signal 2002, and an RF data signal transmitting section 220 that outputs an RF data signal 2004 that is a radio signal having a data signal from which unwanted components have been filtered after a symbolized transmit data signal 2003 that is one output of symbolization section 210 has undergone predetermined modulation, frequency conversion to a high-speed radio frequency, and amplification to a predetermined power level. Pulse modulation type transmitting apparatus 200 also has an RF synchronization signal transmitting section 230 that outputs an RF frame synchronization signal 2006 that is a radio signal having a frame synchronization signal from which unwanted components have been filtered after a symbolized frame synchronization signal 2005 that is the other output of symbolization section 210 has undergone predetermined modulation, frequency conversion to a high-speed radio frequency, and amplification to a predetermined power level. Two antennas 201a and 201b that send RF data signal 2004 or RF frame synchronization signal 2006 to a transmission medium (not shown) are connected to RF data signal transmitting section 220 and RF synchronization signal transmitting section 230 respectively.

Symbolization section 210 receives transmit data signal 2001 and frame synchronization signal 2002, performs symbolization on each signal, and outputs resulting symbolized transmit data signal 2003 and symbolized frame synchronization signal 2005.

RF data signal transmitting section 220 is composed of a modulation section 221a, a frequency conversion section 222a, an amplifier 223a, and a band-pass filter 224a. Modulation section 221a executes predetermined modulation on symbolized transmit data signal 2003, after which frequency conversion section 222a performs frequency conversion to radio frequency. Then amplifier 223a amplifies the signal to a predetermined power level, and band-pass filter 224a eliminates unwanted components and outputs RF data signal 2004.

RF synchronization signal transmitting section 230 is composed of a modulation section 221b, a frequency conversion section 222b, an amplifier 223b, and a band-pass filter 224b. Modulation section 221b executes predetermined modulation on symbolized frame synchronization signal 2005, after which frequency conversion section 222b performs frequency conversion to radio frequency. Then amplifier 223b amplifies the signal to a predetermined power level, and band-pass filter 224b eliminates unwanted components and outputs RF frame synchronization signal 2006.

Next, the operation of a pulse modulation type transmitting apparatus and pulse modulation type receiving apparatus according to this embodiment will be described.

Pulse modulation type transmitting apparatus 200 receives a start/stop directive signal 2007 directing starting or stopping of RF synchronization signal transmitting section 230 from an internal start/stop directive signal generation section (not shown) described later herein, and performs starting or stopping of RF synchronization signal transmitting section 230.

When new communication with pulse modulation type receiving apparatus 100 is to be started, a start signal is sent to RF synchronization signal transmitting section 230 from the start/stop directive signal generation section.

When RF synchronization signal transmitting section 230 starts, transmit data signal 2001 and frame synchronization signal 2002 to be transmitted to communicating-party pulse modulation type receiving apparatus 100 are input to symbolization section 210, and predetermined symbolization is executed on transmit data signal 2001 and frame synchronization signal 2002 by symbolization section 210.

In symbolization, input bit values (1 or 0) are converted to a plurality of pulse signal sequences made up of a pattern configured according to a predetermined rule, and output. In symbolization, instead of performing symbolization whereby conversion to a pulse signal sequence comprising a plurality of bits is executed for input of one bit, symbolization may be performed whereby conversion to a pulse signal sequence comprising a plurality of bits is executed for input of a plurality of bits.

Symbolized transmit data signal 2003 resulting from symbolizing transmit data signal 2001 is input to RF data signal transmitting section 220, and symbolized frame synchronization signal 2005 resulting from symbolizing frame synchronization signal 2002 is input to RF synchronization signal transmitting section 230.

Then, symbolized transmit data signal 2003 input to RF data signal transmitting section 220 undergoes predetermined modulation by modulation section 221a, followed by frequency conversion to radio frequency by frequency conversion section 222a. The signal is then amplified to a predetermined power level by amplifier 223a, has unwanted components eliminated by band-pass filter 224a, and is output to antenna 201b. The modulation method used by modulation section 221a is a method such as OOK (On Off Keying), BPSK (Binary Phase Shift Keying), QPSK (Quadrature Phase Shift Keying), PPM (Pulse Phase Modulation), or the like. Frequency conversion methods that may be used include combining a sine wave source and a mixer circuit and mixing a high-frequency carrier signal generated by the sine wave source with the modulation section 221a output signal by means of the mixer circuit, or turning a high-frequency carrier signal generated by the sine wave source on/off by means of the modulation section 221a output signal using a switch element, or turning the sine wave source itself on/off by means of the modulation section 221a output signal.

RF data signal 2004 output from RF data signal transmitting section 220 is then sent to communicating-party pulse modulation type receiving apparatus 100 by antenna 201a via a transmission medium (not shown).

Meanwhile, symbolized frame synchronization signal 2005 input to RF synchronization signal transmitting section 230 undergoes predetermined modulation by modulation section 221b, followed by frequency conversion to radio frequency by frequency conversion section 222b. The signal is then amplified to a predetermined power level by amplifier 223b, has unwanted components eliminated by band-pass filter 224b, and is output to antenna 201b.

The modulation method used by modulation section 221b and the frequency conversion method used by frequency conversion section 222b are the same the modulation method and frequency conversion method used in RF data signal transmitting section 220. Different modulation methods may also be used by modulation section 221a and modulation section 221b as long as they are modulation methods that allow demodulation by communicating-party pulse modulation type receiving apparatus 100. Furthermore, different frequency conversion methods may be used by frequency conversion section 222a and frequency conversion section 222b as long as conversion to a predetermined radio frequency is performed by each.

RF frame synchronization signal 2006 output from RF synchronization signal transmitting section 230 is then sent to communicating-party pulse modulation type receiving apparatus 100 by antenna 201b via a transmission medium (not shown).

The operation described thus far is a transmit operation for transmit data signal 2001 and frame synchronization signal 2002 by pulse modulation type transmitting apparatus 200 when RF synchronization signal transmitting section 230 is in the started state. Next, the operation of pulse modulation type transmitting apparatus 200 will be described when a stop signal output from the start/stop directive signal generation section is impressed on RF synchronization signal transmitting section 230.

Communicating-party pulse modulation type receiving apparatus 100 receives frame synchronization establishment information indicating that frame synchronization has been established, and after a predetermined time has elapsed, sends a stop signal to RF synchronization signal transmitting section 230 of pulse modulation type transmitting apparatus 200 from the start/stop directive signal generation section (not shown). Instead of a method whereby frame synchronization establishment information is received and a stop signal is sent after a predetermined time has elapsed, a method may be used whereby frame synchronization is established, and after a predetermined time has elapsed, a stop signal issuance request signal is sent from pulse modulation type receiving apparatus 100 to pulse modulation type transmitting apparatus 200, this stop signal issuance request signal is received, and a stop signal is issued.

When a stop signal is input to RF synchronization signal transmitting section 230, the power supply to RF synchronization signal transmitting section 230 is stopped by a power supply start/stop control circuit (not shown) in RF synchronization signal transmitting section 230.

After performing synchronization establishment using RF frame synchronization signal 1005, pulse modulation type receiving apparatus 100 performs synchronization maintenance by means of frame synchronization signal 1009 generated using second template signal 1007. However, major synchronization drift may occur due to an accumulated time discrepancy between timing on the pulse modulation type transmitting apparatus side and timing on the pulse modulation type receiving apparatus side as the elapsed time from the start of communication grows longer, or a time discrepancy due to the phase relationship of pulse modulation type receiving apparatus 100 and pulse modulation type transmitting apparatus 200, or communication path variations.

Slight synchronization drift is corrected by second frame synchronization timing adjustment section 150 in frame synchronization section 140, but if, for example, synchronization drift correction is performed in a time domain in which second template signal 1007 is "1", and the synchronization drift correction is such as to greatly exceed that time domain, it is necessary to extend the synchronization correction cycle, and the necessity of setting a constant that conflicts with shortening of the synchronization time arises.

Thus, after issuing a stop directive signal, the start/stop directive signal generation section (not shown) alternately sends a start directive signal and stop directive signal to RF synchronization signal transmitting section 230 at predetermined time intervals. Pulse modulation type receiving apparatus 100 performs synchronization drift correction using RF frame synchronization signals received at predetermined time intervals after synchronization establishment (hereinafter referred to as RF frame synchronization maintenance signals).

A mode may also be employed in which the power supply is stopped after a section stops. For example, after frame synchronization establishment, the power supply of receiving section 110b or first frame synchronization timing adjustment section 160—or both—of pulse modulation type receiving apparatus 100 may be stopped, or the power supply of RF synchronization signal transmitting section 230 of pulse modulation type transmitting apparatus 200 may be stopped, or both may be performed.

Next, the operation of a pulse modulation type receiving apparatus will be described. Pulse modulation type receiving apparatus 100 extracts receive RF data signal 1004 by means of antenna 101a and receiving section 110a, and extracts RF frame synchronization signal 1005 by means of antenna 101b and receiving section 110b, from a radio signal sent by communicating-party pulse modulation type transmitting apparatus 200.

Frame synchronization section 140 synchronizes frame synchronization signal 1009 with receive RF data signal 1004 in order to extract correlation receive data signal 1010—a baseband pulse signal—from receive RF data signal 1004 and RF frame synchronization signal 1005. However, an RF data pulse sequence composing receive RF data signal 1004 also has a state with no pulse signal dependency according to time. Therefore, heretofore, when a frame synchronization signal is synchronized with an RF data signal from such a time state with no pulse signal dependency, synchronization establishment has taken a long time. That is to say, since it is necessary for synchronization to be accomplished in a time interval shorter than the cycle of a carrier forming a frame synchronization signal, synchronization establishment takes a long time when the carrier frequency is high, or when there is a long interval from the start of synchronization until the appearance of an RF data pulse.

Meanwhile, a frame synchronization establishment operation comprises a mode in which the general position of an RF data pulse composing a received receive RF data signal 1004 is detected (hereinafter referred to as pulse acquisition), and a mode in which the phases of receive RF data signal 1004 and frame synchronization signal 1009 are made to coincide (hereinafter referred to as pulse phase acquisition).

Thus, in order to achieve speedy frame synchronization establishment, RF frame synchronization signal 1005 having a template signal that is frame synchronization signal information synchronized with an RF data pulse that is data signal information is used in the pulse acquisition process.

Second frame synchronization timing adjustment section 150 synchronizes receive RF data signal 1004 with frame synchronization signal 1009 generated by frame synchronization signal generation section 141 based on first template signal 1006 from first frame synchronization timing adjustment section 160.

At this time, the phase relationship of an RF data pulse and first template signal 1006 composing frame synchronization signal 1009 is one of identical timing, and therefore the phase relationship of an RF data pulse composing an RF data signal and a template signal of RF frame synchronization signal 1005 is also one of coincidence. Furthermore, first template signal 1006 output from first frame synchronization timing adjustment section 160 has a coincident phase relationship with the template signal of RF frame synchronization signal 1005, and therefore frame synchronization signal 1009 generated by frame synchronization signal generation section 141 also has a coincident phase relationship with an RF data pulse composing receive RF data signal 1004. As a result, it is possible to implement pulse acquisition from the start of the synchronization establishment process.

That is to say, correlation section 153 of second frame synchronization timing adjustment section 150 can obtain correlation output from the start of the synchronization establishment process by multiplying receive RF data signal 1004 by frame synchronization signal 1009. Frame synchronization correlation determination unit 155 determines the correlation between receive RF data signal 1004 and frame synchronization signal 1009. Frame synchronization correlation determination unit 155 delays frame synchronization signal 1009 by controlling variable delay section 151 using control signal 1013 until the correlation output reaches a first predetermined value. In this way, second frame synchronization timing adjustment section 150 can perform pulse phase acquisition by means of feedback control of the phase of the carrier forming a frame synchronization signal, and establish synchronization.

Here, design is desirable such that the phase relationship of the RF data signal carrier at the rise of an RF data pulse composing receive RF data signal 1004, and the frame synchronization signal carrier at the rise of a synchronization template signal composing frame synchronization signal 1009, is one of coincidence—that is, one of identical timing—but if the phase relationship of the carrier levels is not one of coincidence, control is performed so that correlation output is obtained and a coincident phase relationship of the carrier levels is finally achieved. When design is performed so that the phase relationship with the frame synchronization signal carrier is one of coincidence, pulse acquisition and pulse phase acquisition can be implemented simultaneously by making the delay amount of variable delay section 151 0 (zero), without performing feedback control. In this case, almost no time is required to establish synchronization, and correlation receive data signal 1010 is obtained from the start of the frame synchronization establishment operation, eliminating the need to send extra data for frame synchronization establishment, and making possible still faster data communication.

Although a delay amount of 0 (zero) has been mentioned, this applies to a case in which the intrinsic delay amount of wiring and so forth (not shown) to template signal switching section 142, variable delay section 151, amplifier 152, and correlation section 153 has been corrected as appropriate. Of course, the intrinsic delay amounts of antennas 101a and 101b, band-pass filters 102a and 102b, and low-noise amplifiers 103a and 103b are also assumed to have been corrected as appropriate.

Even after frame synchronization establishment has been completed, it is possible to perform synchronization maintenance using RF frame synchronization signal 1005 and start a symbol synchronization operation. However, always sending RF frame synchronization signal 2006 would lead to a drop in frequency utilization efficiency. Thus, the template signal used for frame synchronization signal 1009 generation is switched from first template signal 1006 generated by first frame synchronization timing adjustment section 160 to second template signal 1007 generated by second template signal generation section 143.

Before switching is performed, synchronization establishment—that is, timing coordination—between first template signal 1006 and second template signal 1007 is carried out. This synchronization establishment operation is performed by executing the same operation as an operation using first or second frame synchronization timing adjustment section 160/150, using a correlation section, low-pass filter, correlation determination unit, variable delay section, and so forth (not shown) in second template signal generation section 143. After synchronization has been established by second template signal generation section 143, or at a predetermined time before first template signal 1006 output stops after synchronization establishment, a transition is made from a synchronization maintenance state in which first template signal 1006 is referenced to an auto synchronization maintenance state in which the synchronization-established state is maintained without referencing first template signal 1006.

By this means, it is possible to maintain the state in which synchronization was initially established even if RF frame synchronization signal 2006 ceases to be sent from communicating-party pulse modulation type transmitting apparatus 200, or if operation of first frame synchronization timing adjustment section 160 is stopped after switchover of the synchronization template signal.

When first template signal 1006 is input after the transition to the auto synchronization maintenance state, the fact that this is a first template signal generated by input of an RF frame synchronization maintenance signal for performing synchronization drift correction is detected by a synchronization drift correction RF frame synchronization maintenance signal input detection circuit (not shown). Then frame synchronization section 140 terminates the auto synchronization maintenance state and resynchronizes second template signal 1007 with first template signal 1006.

Thereafter, the auto synchronization maintenance state and resynchronization state are repeated alternately according to input of the synchronization drift correction RF frame synchronization maintenance signal.

When a transition has been made to the auto synchronization maintenance state, and a first template signal 1006/second template signal 1007 switching directive signal is being input from frame synchronization correlation determination unit 155 of second frame synchronization timing adjustment section 150, template signal switching section 142 switches from first template signal 1006 to second template signal 1007, and outputs this signal to frame synchronization signal generation section 141 as synchronization template signal 1008.

By means of the above-described switching operation, a transition is made from frame synchronization using RF frame synchronization signal 1005 to frame synchronization using second template signal 1007, and a frame synchronization maintenance state in which second template signal 1007 is used is established.

Next, the operation of symbol synchronization section 170 will be described. After frame synchronization has been established, decoded data signal 1015 is restored by symbol synchronization section 170 based on correlation receive data signal 1010 output from frame synchronization section 140. In pulse modulation type transmitting apparatus 200, one or a plurality of bits of a transmit data signal in symbolization section 210 are converted to a plurality of pulse signal sequences made up of a pattern configured according to a predetermined rule, and output.

Therefore, in order to restore decoded data signal 1015 from correlation receive data signal 1010, it is necessary to perform the reverse of the above-described operation. As described above, an operation performed by symbolization section 210 is spreading coding processing. Also, an operation performed by symbol synchronization section 170 is despreading coding processing.

Symbol coding is not an absolutely necessary operation, but, as with CDMA communication using a continuous wave, is one method of implementing multiplexing in pulse communication. Correlation receive data signal 1010 input to symbol synchronization section 170 is split into two by a splitter (not shown), with one signal being input to first symbol synchronization timing adjustment section 180 and the other to timing regeneration section 171.

When correlation receive data signal 1010 is input to timing regeneration section 171, timing regeneration section 171 generates internal generation timing signal 1011, in which pulses occur at predetermined time intervals, by means of virtually the same kind of operation as described in the explanation of a second template signal generation operation by second template signal generation section 143 of frame synchronization section 140, based on correlation receive data signal 1010.

That is to say, using an internal correlation section, low-pass filter, correlation determination unit, variable delay section, and so forth (not shown), timing regeneration section 171 generates internal generation timing signal loll synchronized with correlation receive data signal 1010 by executing an operation using first or second frame synchronization timing adjustment section 160/150, and outputs internal generation timing signal loll to symbol synchronization signal generation section 172.

Also, if BPSK is used as a modulation method, there are successive correlation receive data signal 1010 data sequences at fixed intervals, and therefore internal generation timing signal 1011 can be generated by using only that amplitude information. Also, if OOK modulation or PPM modulation is used, although data sequences are not at fixed intervals, it is possible to generate internal generation timing signal 1011 for establishing symbol synchronization with any data sequence.

Symbol synchronization signal generation section 172 receives internal generation timing signal 1011, generates symbol synchronization signal 1012 having a plurality of pulse sequences for restoring decoded data signal 1015, and sends symbol synchronization signal 1012 to first symbol synchronization timing adjustment section 180.

First symbol synchronization timing adjustment section 180 decodes decoded data signal 1015 from the communicating party by multiplying together input correlation receive data signal 1010 and symbol synchronization signal 1012 by means of correlation section 182 and performing correlation, and outputs decoded data signal 1015. If there is a discrepancy in the timing of symbol synchronization signal 1012 and correlation receive data signal 1010 at this time, this timing discrepancy will result in an incorrect time slot being at the head of a symbol in a correlation receive data signal pulse sequence. Variable delay section 181 can achieve symbol synchronization by changing the delay time.

A delay time change is implemented by having delay amount change control signal 1014 sent from symbol synchronization correlation determination unit 184 to variable delay section 181 until the correlation value reaches a predetermined value. Variable delay section 181 performs a delay time change based on delay amount change control signal 1014. The delay amount is changed quantally with a time slot T as the step width, and step widths may be incremented/decremented successively one at a time, or the number of steps for incrementing/decrementing may be changed according to the amount of change.

According to a pulse modulation type transmitting apparatus and pulse modulation type receiving apparatus of Embodiment 1 of the present invention, pulse modulation type transmitting apparatus 200 is provided with an RF data signal transmitting section 220 and RF synchronization signal transmitting section 230 that separately send a transmit data signal 2001 and frame synchronization signal 2002 respectively.

Also, frame synchronization section 140 of pulse modulation type receiving apparatus 100 is provided with a first frame synchronization timing adjustment section 160 that generates a first template signal 1006 generated based on an RF frame synchronization signal 1005 that is a separately sent signal, and a second template signal generation section 143 that generates a second template signal 1007 synchronized with first template signal 1006. Frame synchronization section 140 is also provided with a template signal switching section 142 that selects either first template signal 1006 or second template signal 1007 and performs switched output of the selected signal as a synchronization template signal 1008, a frame synchronization signal generation section 141 that receives synchronization template signal 1008 synchronized with an RF data pulse composing receive RF data signal 1004 and generates a frame synchronization signal 1009, and a second frame synchronization timing adjustment section 150 that generates a correlation receive data signal 1010 from receive RF data signal 1004 and frame synchronization signal 1009 and outputs correlation receive data signal 1010.

Then, in pulse acquisition or pulse phase acquisition in initial synchronization establishment at the start of communication, frame synchronization is performed by means of first template signal 1006 generated based on RF frame synchronization signal 1005, and after synchronization establishment, frame synchronization is performed by means of second template signal 1007.

By this means, it is possible to establish synchronization in a shorter time than when separately sent RF frame synchronization signal 1005 is not used and establishment of synchronization with receive RF data signal 1004 is performed using an internally generated frame synchronization signal, thereby making it possible to increase the communication speed.

Also, the second template signal is synchronized with first template signal 1006 during synchronization establishment, and switchover is performed from first template signal 1006 to second template signal 1007 for synchronization maintenance after synchronization establishment. By this means, the operation of RF synchronization signal transmitting section 230 in pulse modulation type transmitting apparatus 200 or receiving section 110*b* in pulse modulation type receiving apparatus 100 can be stopped during synchronization maintenance, enabling lower power consumption to be achieved by reducing the number of operating circuits in pulse modulation type transmitting apparatus 200 and pulse modulation type receiving apparatus 100.

Furthermore, while transmission of RF frame synchronization signal 2006 by pulse modulation type transmitting apparatus 200 is stopped, the frequency band used for RF frame synchronization signal transmission can also be used for RF transmit data signal transmission, enabling a pulse modulation type transmitting apparatus, pulse modulation type receiving apparatus, and system to be implemented that make still faster data transmission possible.

Frame synchronization section 140 of the above-described embodiment is shown as having a configuration in which first template signal 1006 generated by means of separately sent RF frame synchronization signal 1005 is used for frame synchronization establishment, and second template signal 1007 is used for synchronization maintenance after synchronization establishment, but a configuration may also be employed in which receive RF data signal 1004 is used as a second template signal in synchronization maintenance after synchronization establishment. Moreover, a configuration may be employed in which receive RF data signal 1004 is used as the first template signal generated by means of separately sent RF frame synchronization signal 1005 not only for synchronization maintenance but also for synchronization establishment.

In the above description, a case has been described in which frame synchronization timing indicating pulse position and phase, and symbol synchronization timing indicating code sequence position, are separately sent information, but information relating to inter-device authentication may also be sent separately. An example of the inter-device authentication procedure is for a reception-capable device to receive a signal containing separately sent authentication information, and to perform detection of another device's transmission request and communicating party restriction. In this case, authentication data may be added to either the RF frame synchronization signal or RF symbol synchronization timing signal, or may be sent separately as a new signal. An effect of performing authentication by means of a separately sent signal in this way is that an authentication data part is unnecessary in a communication data signal, and lowering of the data rate can be avoided.

The data rate may also be varied for a data signal, frame synchronization timing signal, and symbol synchronization timing signal. Varying the data rates of the signals in this way makes it possible to narrow the band occupied by a low-rate signal, and reduce the frequency band used.

When a low-rate signal is received, it is possible to perform coordinated operation with another type of pulse communication.

It is sufficient for at least one of the RF data signal, the RF frame synchronization signal, and the RF symbol synchronization timing signal to be transmitted. By this means, coordinated operation such as communication collision prevention can be performed with another device within the same system, or a device of another system, by transmitting only a specific-use signal.

By receiving signals using another modulation method, such as OFDM system signals, rather than only pulse communication system signals, it is possible to control the transmit timing and output level so as to reduce inter-system interference.

By performing low-precision synchronization with the second RF input signal and high-precision synchronization with the first RF input signal, the power consumption of the synchronization circuitry can be reduced by, for example, performing rough synchronization in a low-rate communication system or communication method, and performing high-precision synchronization in a high-rate communication system or communication method as necessary, and the time from the start of high-precision synchronization until synchronization establishment can be shortened by performing rough synchronization at fixed time intervals.

Embodiment 2

Next, a pulse modulation type transmitting apparatus and pulse modulation type receiving apparatus of Embodiment 2 of the present invention will be described. Differences from Embodiment 1 lie in the pulse modulation type receiving apparatus, while the pulse modulation type transmitting apparatus is the same as in Embodiment 1. A block diagram of a pulse modulation type receiving apparatus of Embodiment 2 of the present invention is shown in FIG. 3.

Figure 3:
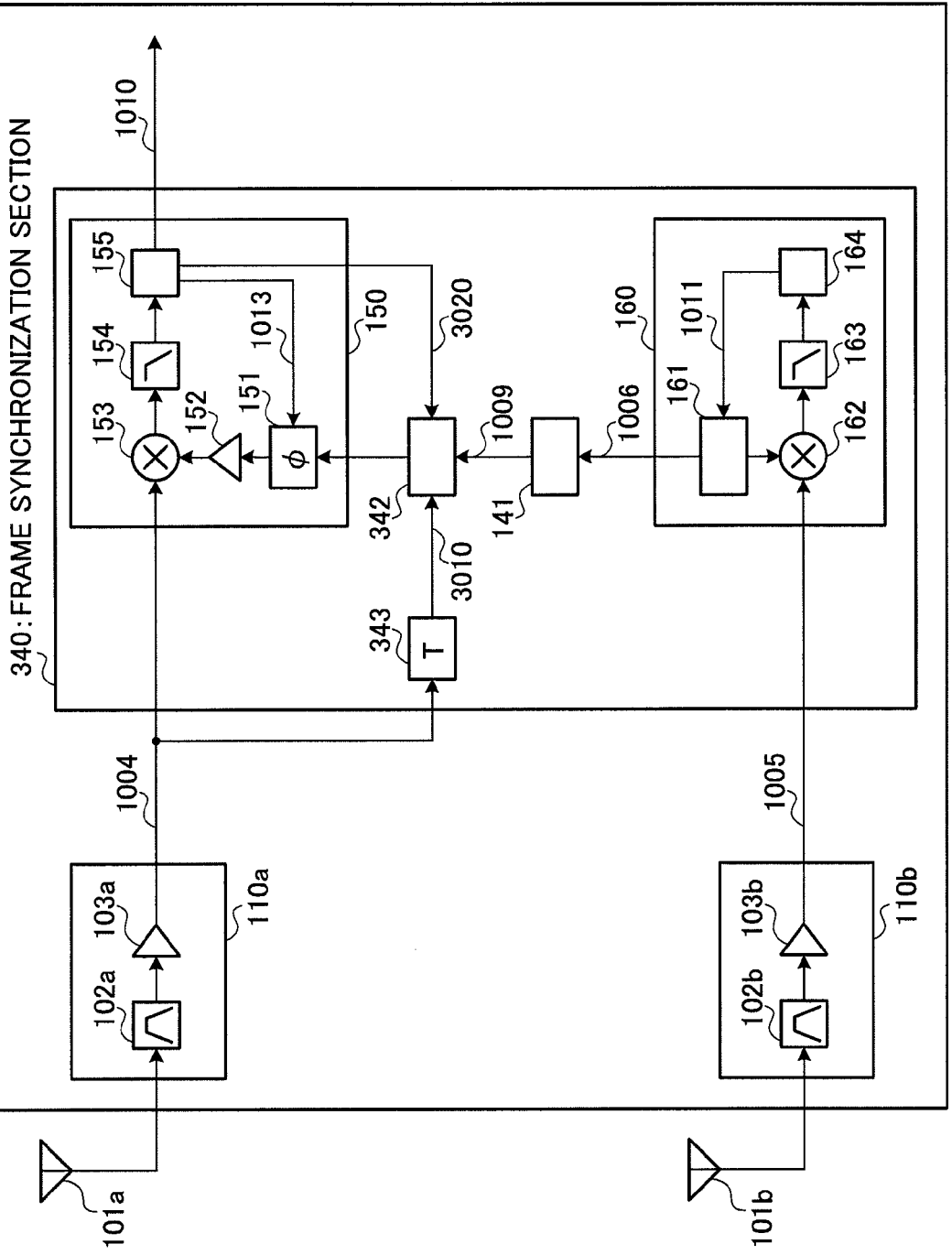
FIG. 3 is a block diagram showing the configuration of a pulse modulation type receiving apparatus according to Embodiment 2 of the present invention.

FIG. 3 is a block diagram showing the configuration of a frame synchronization section 340 that uses first template signal 1006 generated by means of separately sent RF frame synchronization signal 1005 for frame synchronization establishment, and uses a delayed receive RF data signal 3010, resulting from delaying receive RF data signal 1004 by a predetermined time T by means of a variable delay section 343, for synchronization maintenance after synchronization establishment. Frame synchronization section 340 differs from the configuration of pulse modulation type receiving apparatus 100 in FIG. 1 as follows. Namely, frame synchronization section 340 does not have second template signal generation section 143 or template signal switching section 142 of FIG. 1, but has a frame synchronization signal switching section 342 and variable delay section 343, and has frame synchronization signal generation section 141 between frame synchronization signal switching section 342 and first template signal generation section 161 of first frame synchronization timing adjustment section 160, and receive RF data signal 1004 is input to frame synchronization signal switching section 342 after being delayed by predetermined time T by variable delay section 343.

Differences from the operation of frame synchronization section 140 are as follows.

At the start of input when receive RF data signal 1004 and RF frame synchronization signal 1005 are input to frame synchronization section 340, frame synchronization signal 1009 generated by frame synchronization signal generation section 141 is selected by frame synchronization signal switching section 342 using first template signal 1006, and is output to second frame synchronization timing adjustment section 150.

Second frame synchronization timing adjustment section 150 performs correlation with frame synchronization signal 1009 output from frame synchronization signal switching section 342 for receive RF data signal 1004 while accomplishing synchronization of frame synchronization signal 1009 output from frame synchronization signal switching section 342 for receive RF data signal 1004. Also, when the output of frame synchronization correlation determination unit 155 reaches a first predetermined value, second frame synchronization timing adjustment section 150 sends a frame synchronization signal switching signal 3020 to frame synchronization signal switching section 342.

Frame synchronization signal switching section 342 receives frame synchronization signal switching signal 3020, switches input from first template signal 1006 to delayed receive RF data signal 3010, and outputs delayed receive RF data signal 3010 to second frame synchronization timing adjustment section 150.

Second frame synchronization timing adjustment section 150 performs correlation with delayed receive RF data signal 3010 for receive RF data signal 1004 while accomplishing synchronization of delayed receive RF data signal 3010 for receive RF data signal 1004, and outputs control signal 1013 to variable delay section 151 until the output of frame synchronization correlation determination unit 155 reaches a second predetermined value.

When the output of frame synchronization correlation determination unit 155 reaches the second predetermined value, synchronization of delayed receive RF data signal 3010 with respect to receive RF data signal 1004 is established, and predetermined correlation receive data signal 1010 is output from frame synchronization correlation determination unit 155.

That is to say, in frame synchronization the same operation is accomplished as in the case of frame synchronization section 140 shown in FIG. 1, but in frame synchronization establishment, receive RF data signal 1004 is split into two, and delay detection is performed whereby correlation receive data signal 1010 is detected using delayed receive RF data signal 3010 resulting from delaying one of the two signals by predetermined time T by means of variable delay section 343. The above are the points of difference from the operation of frame synchronization section 140.

In delay detection, correlation is performed using the same signal, and therefore the signal to noise ratio is 3 dB lower than with coherent detection, but with this configuration the circuit configuration is simplified inasmuch as second template signal generation section 143 is not necessary, and power consumption can be reduced.

In the above description, level adjustment of template signals 1006 and 1007 and frame synchronization signal 1009 has not been described, but it goes without saying that that signal level adjustment is performed by means of an amplifier or the like according to elements used in multiplication processing and correlation processing.

Embodiment 3

Next, a pulse modulation type transmitting apparatus and pulse modulation type receiving apparatus of Embodiment 3 of the present invention will be described. Differences from Embodiment 2 lie in the pulse modulation type receiving apparatus, while the pulse modulation type transmitting apparatus is the same as in Embodiment 1. A block diagram of a pulse modulation type receiving apparatus of Embodiment 3 of the present invention is shown in FIG. 4.

Figure 4:
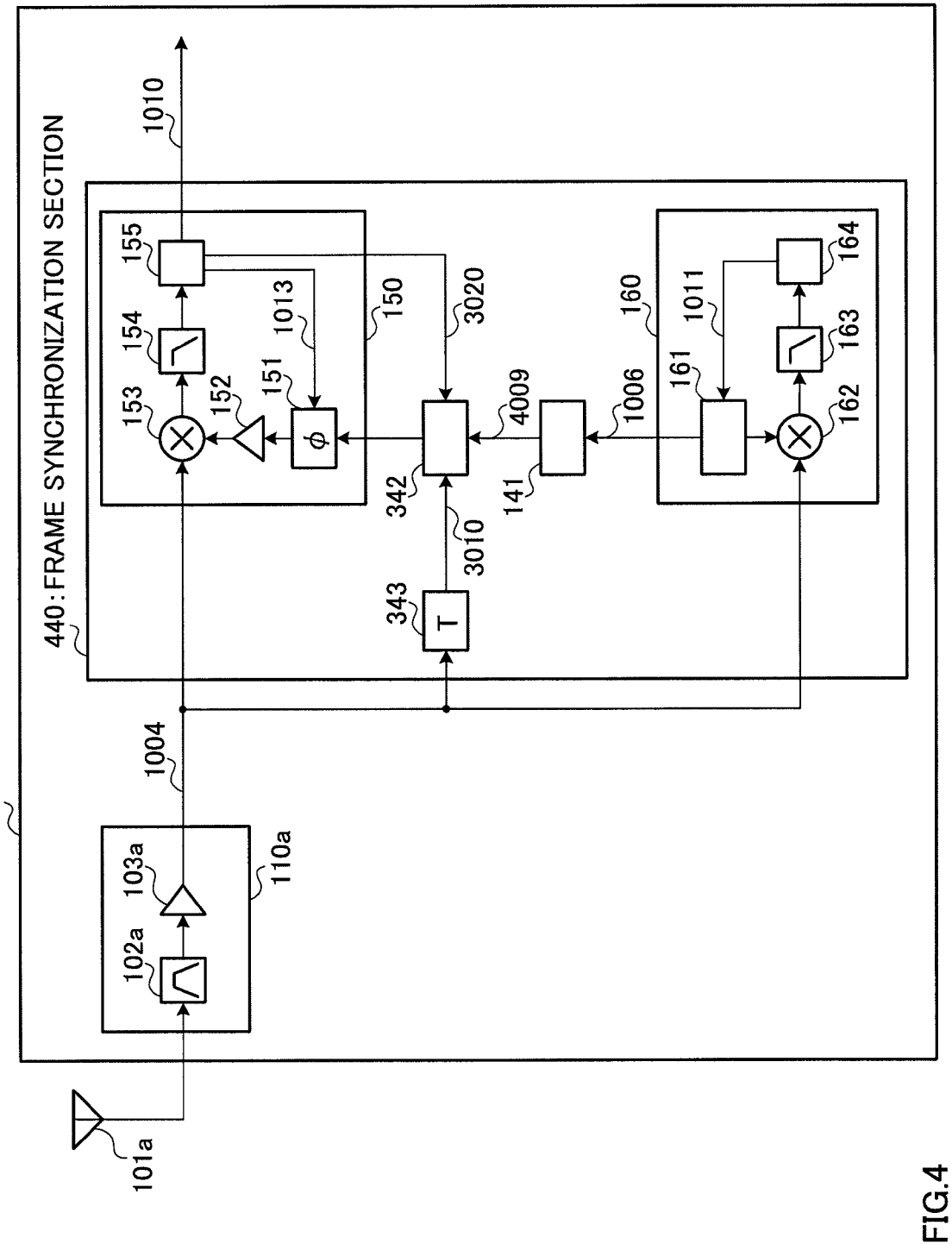
FIG. 4 is a block diagram showing the configuration of a pulse modulation type receiving apparatus according to Embodiment 3 of the present invention.

FIG. 4 is a block configuration diagram of a pulse modulation type receiving apparatus having a frame synchronization section 440 that uses receive RF data signal 1004. Pulse modulation type receiving apparatus 400 differs from the pulse modulation type receiving apparatus in FIG. 3 as follows. Namely, pulse modulation type receiving apparatus 400 is not connected to antenna 101b shown in FIG. 3, and does not have an antenna 101b; an RF data signal is split into three for input to frame synchronization section 440; and receive RF data signal 1004, not RF frame synchronization signal 1005, is input to correlation section 162 of first frame synchronization timing adjustment section 160.

Differences from the operation of frame synchronization section 340 are as follows.

At the start of input when receive RF data signal 1004 is input to the frame synchronization section, delayed receive RF data signal 3010 is selected by frame synchronization signal switching section 342, and is output to second frame synchronization timing adjustment section 150.

Second frame synchronization timing adjustment section 150 performs correlation with delayed receive RF data signal 3010 output from frame synchronization signal switching section 342 for receive RF data signal 1004 while accomplishing synchronization of delayed receive RF data signal 3010 output from frame synchronization signal switching section 342 for receive RF data signal 1004. Also, when the output of frame synchronization correlation determination unit 155 reaches a first predetermined value, second frame synchronization timing adjustment section 150 sends frame synchronization signal switching signal 3020 to frame synchronization signal switching section 342.

Frame synchronization signal switching section 342 receives frame synchronization signal switching signal 3020, switches input from delayed receive RF data signal 3010 to a frame synchronization signal 4009, and outputs frame synchronization signal 4009 to second frame synchronization timing adjustment section 150.

Second frame synchronization timing adjustment section 150 performs correlation with frame synchronization signal 4009 for receive RF data signal 1004 while accomplishing synchronization of frame synchronization signal 4009 for receive RF data signal 1004, and outputs control signal 1013 to variable delay section 151 until the output of frame synchronization correlation determination unit 155 reaches a second predetermined value.

When the output of frame synchronization correlation determination unit 155 reaches the second predetermined value, synchronization of delayed receive RF data signal 3010 with respect to receive RF data signal 1004 is established, and predetermined correlation receive data signal 1010 is output from frame synchronization correlation determination unit 155.

That is to say, receive RF data signal 1004 is split into three, and in frame synchronization, delay detection is accomplished whereby correlation receive data signal 1010 is detected using delayed receive RF data signal 3010 resulting from delaying one of the three signals by predetermined time T by means of variable delay section 343. Also, in frame synchronization establishment, coherent detection is performed whereby correlation receive data signal 1010 is detected using frame synchronization signal 4009 generated by frame synchronization signal generation section 141 based on first template signal 1006 generated using another of the three split receive RF data signals 1004. The above are the points of difference from the operation of frame synchronization section 340.

That is to say, in frame synchronization, delay detection is accomplished whereby one of the three split receive RF data signals 1004 is delayed by predetermined time T, and correlation receive data signal 1010 is detected.

Then, during frame synchronization, synchronization with a rising waveform of an RF data pulse composing receive RF data signal 1004 can be achieved based on another of the three split receive RF data signals 1004. Furthermore, first template signal 1006 in which 1s and 0s alternate is generated by first template signal generation section 161.

After synchronization has been achieved with a rising waveform of an RF data pulse composing receive RF data signal 1004, frame synchronization signal switching section 342 switches receive RF data signal 1004 to frame synchronization signal 4009 from frame synchronization signal generation section 141, and outputs frame synchronization signal 4009 to second frame synchronization timing adjustment section 150.

In delay detection, correlation is performed using the same signal, and therefore the signal to noise ratio is 3 dB lower than with coherent detection, but an advantage is that the circuitry for pulse acquisition and pulse phase acquisition is less complicated than with coherent detection.

Also, unlike a template signal of RF frame synchronization signal 1005, RF data pulses of receive RF data signal 1004 are not successive alternating 1s and 0s. Moreover, sensitivity falls in correlation determination unit 164.

Therefore, although the time required for synchronization establishment is longer and timing stability is lower than in the case of the configuration of frame synchronization section 140 in FIG. 1, with this configuration it is possible to implement a communication system with good frequency utilization efficiency without using separately sent RF frame synchronization signal 1005.

In the above description, level adjustment of template signal 1006 and frame synchronization signal 1009 has not been described, but it goes without saying that that signal level adjustment is performed by means of an amplifier or the like according to elements used in multiplication processing and correlation processing.

Embodiment 4

Figure 5:
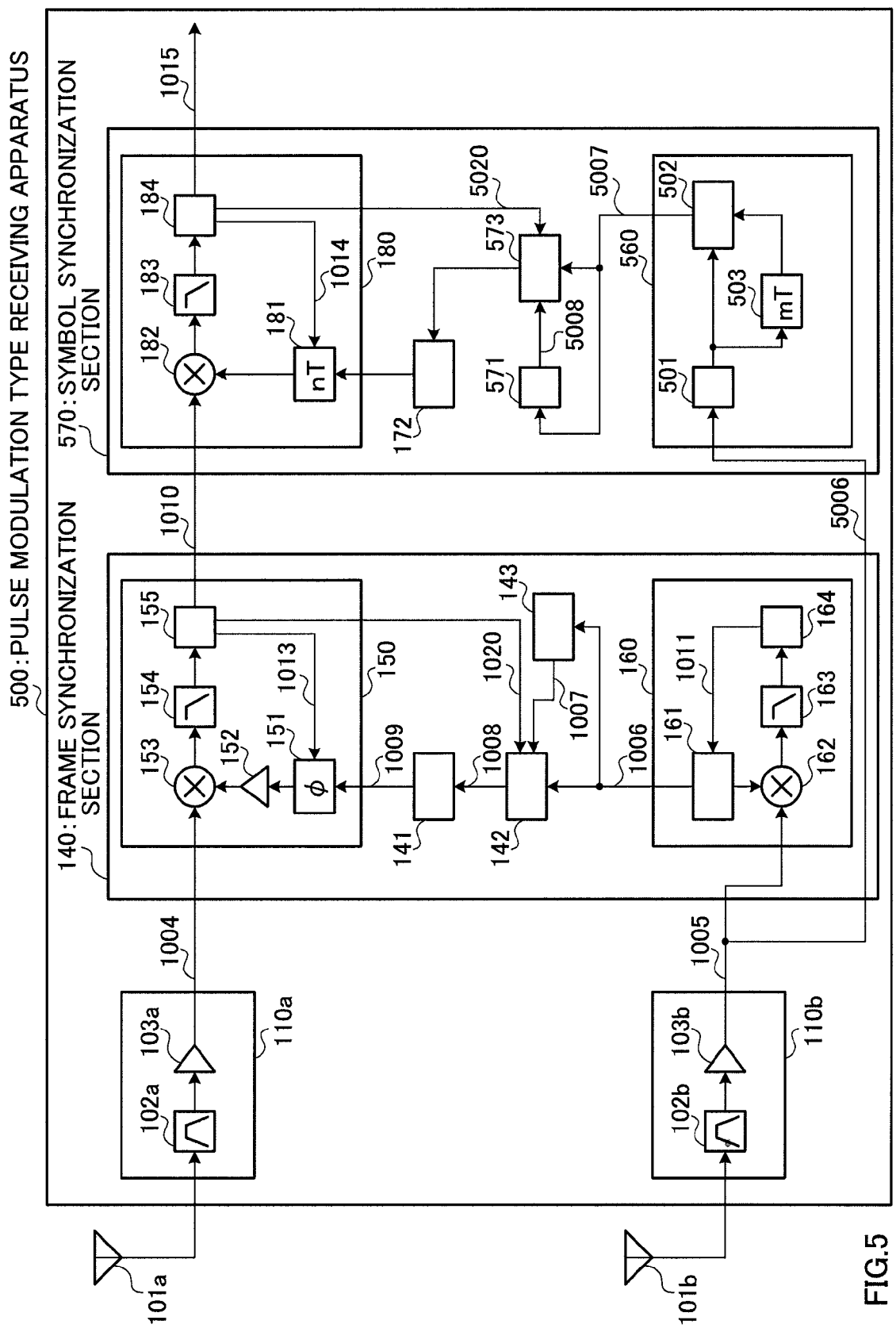
FIG. 5 is a block diagram showing the configuration of a pulse modulation type receiving apparatus according to Embodiment 4 of the present invention.

Next, a pulse modulation type transmitting apparatus and pulse modulation type receiving apparatus of Embodiment 4 of the present invention will be described. Differences from Embodiment 1 lie in the pulse modulation type receiving apparatus, while the pulse modulation type transmitting apparatus is the same as in Embodiment 1. A block diagram of a pulse modulation type receiving apparatus of Embodiment 4 of the present invention is shown in FIG. 5.

The configuration in FIG. 5 differs from that of Embodiment 1 in that, in addition to RF frame synchronization signal 1005 used by frame synchronization section 140, a signal with a waveform necessary as a timing signal for symbol synchronization itself is also sent separately at radio frequency (hereinafter referred to as an RF timing signal).

Timing signals include a type whereby a signal is generated only at the start of a symbol, a type whereby a signal is generated at the timing of a plurality of bits within a symbol, and so forth.

Descriptions of parts having the same configuration and operation as in a pulse modulation type transmitting apparatus and pulse modulation type receiving apparatus of Embodiment 1 of the present invention are omitted here, and only differences in configuration and operation are described.

Pulse modulation type receiving apparatus 500 shown in FIG. 5 has the following configuration elements in addition to the configuration of pulse modulation type receiving apparatus 100. Namely, in a symbol synchronization section 570, pulse modulation type receiving apparatus 500 is provided with a second symbol synchronization timing adjustment section 560 that detects a baseband timing signal (referred to as a first timing signal) from a separately sent RF symbol synchronization timing signal 5006 and performs amplitude addition, a clock regeneration section 571 that generates a timing signal 5008 (hereinafter referred to as a second timing signal) synchronized with RF symbol synchronization timing signal 5006, and a timing signal switching section 573 that switches output between second timing signal 5008 and first timing signal 5007.

Second symbol synchronization timing adjustment section 560 detects a baseband timing signal from RF symbol synchronization timing signal 5006 by means of a detection section 501, delays one of two signals resulting from splitting the detected signal by a predetermined time m×T, adds that delayed signal to the other of the two signals, and outputs first timing signal 5007 with a predetermined amplitude or greater.

Clock regeneration section 571 synchronizes a timing signal generated internally by means of an internal template signal generation section, variable delay section, correlation section, low-pass filter, correlation determination unit, and so forth (not shown) with RF symbol synchronization timing signal 5006, and outputs that timing signal.

Timing signal switching section 573 synchronizes second timing signal 5008 with first timing signal 5007, receives a symbol synchronization signal switching signal 5020 from symbol synchronization correlation determination unit 184, and switches output from first timing signal 5007 to second timing signal 5008. Timing signal switching section 573 may also be configured so as to switch output from first timing signal 5007 to second timing signal 5008 after a predetermined time has elapsed.

The operation of a pulse modulation type receiving apparatus of Embodiment 4 of the present invention configured as above will now be described using FIG. 5. While frame synchronization establishment or maintenance is performed on the one hand, establishment of symbol synchronization using first timing signal 5007 is performed by symbol synchronization section 570. First, RF symbol synchronization timing signal 5006 is extracted from a radio signal by means of antenna 101*b* and receiving section 110*b*, and is then input to second symbol synchronization timing adjustment section 560.

Second symbol synchronization timing adjustment section 560 detects a baseband timing signal from RF symbol synchronization timing signal 5006 by means of detection section 501, extends one of two signals resulting from splitting the detected signal by predetermined time m×T by means of a variable delay section 503, adds that signal to the other detected signal by means of an addition/reset circuit section 502, performs a reset after a predetermined number of additions, adds signals an appropriate number of times, and outputs external timing signal 5007. Here, m is an integer denoting the number of frames making up one symbol, and T denotes the time of one symbol length. By this means, the signal to noise ratio can be improved, and it is also possible to follow temporal variations of an arriving timing signal.

Next, external timing signal 5007 is output to symbol synchronization signal generation section 172. Operations from generation of a symbol synchronization signal based on an input first timing signal onward are the same as in Embodiment 1.

Meanwhile, first timing signal 5007 is split into two, and one of the resulting signals is input to clock regeneration section 571. In clock regeneration section 571, a timing signal generated by an internal template signal generation section (not shown) is delayed by a predetermined time by means of a variable delay section, after which correlation is performed together with external timing signal 5007 by means of a correlation section, and after passage through a low-pass filter, the delay amount of the variable delay section is controlled by feedback by means of a correlation determination unit until the correlation output reaches a predetermined value. When the correlation output reaches the predetermined value, second timing signal 5008 generated in clock regeneration section 571 is synchronized with first timing signal 5007.

Following the elapse of a predetermined time after second timing signal 5008 is synchronized with first timing signal 5007, timing signal switching section 573 switches from first timing signal 5007 to second timing signal 5008, and outputs second timing signal 5008 to symbol synchronization signal generation section 172.

Then, after a predetermined time, transmission of RF symbol synchronization timing signal 5006 is stopped, and an RF timing signal for symbol synchronization maintenance (hereinafter referred to as a synchronization maintenance timing signal) is sent from the communicating-party pulse modulation type transmitting apparatus at predetermined time intervals. This operation is the same as frame synchronization in Embodiment 1, and therefore will not be described here.

The configuration of a pulse modulation type transmitting apparatus used in Embodiment 4 is assumed to have a symbol synchronization clock signal applied in pulse modulation type transmitting apparatus 200 in FIG. 2 in addition to frame synchronization signal 2002, and its configuration and operation are the same as in Embodiment 1. A description of this pulse modulation type transmitting apparatus is therefore omitted here.

According to such an Embodiment 4, pulse modulation type transmitting apparatus 200 of Embodiment 1 is given a configuration whereby, in addition to separately sent RF frame synchronization signal 2006, an RF symbol synchronization timing signal is also sent separately, and moreover, pulse modulation type receiving apparatus 100 of Embodiment 1 is provided with a second symbol synchronization timing adjustment section 560 that detects first timing signal 5007 from an RF symbol synchronization timing signal, and a timing signal switching section 573 that establishes symbol synchronization using first timing signal 5007 in symbol synchronization establishment or synchronization maintenance, receives symbol synchronization signal switching signal 5020 from symbol synchronization correlation determination unit 184, and switches from first timing signal 5007 to second timing signal 5008. By this means, reduction of the synchronization establishment time in frame synchronization is achieved, and reduction of the synchronization establishment time in symbol synchronization is also achieved. Switchover from external timing signal 5007 to internal timing signal 5008 may also be performed following the elapse of a predetermined time after symbol synchronization is established.

During frame synchronization maintenance, operation of RF synchronization signal transmitting section 230 in pulse modulation type transmitting apparatus 200 and low-noise amplifier 103*b* in pulse modulation type receiving apparatus 500 can be stopped. In addition, during symbol synchronization maintenance, transmission of an RF frame synchronization signal and RF symbol synchronization timing signal can be stopped on the pulse modulation type transmitting apparatus 200 side, and operation of low-noise amplifier 103*b* and second symbol synchronization timing adjustment section 560 can be stopped on the pulse modulation type receiving apparatus 500 side, enabling still lower power consumption to be achieved by reducing the number of operating circuits in pulse modulation type transmitting apparatus 200 and pulse modulation type receiving apparatus 500.

Furthermore, in addition to RF frame synchronization signal transmission being stopped on the pulse modulation type transmitting apparatus 200 side, the frequency band used for RF frame synchronization signal and RF symbol synchronization timing signal transmission can be used for transmit data signal transmission while RF symbol synchronization timing signal transmission is stopped, enabling a pulse modulation type transmitting apparatus and pulse modulation type receiving apparatus to be implemented that make still faster data transmission possible.

Embodiment 5

Next, a pulse modulation type transmitting apparatus and pulse modulation type receiving apparatus of Embodiment 5 of the present invention will be described. Differences from Embodiment 4 lie in the pulse modulation type receiving apparatus, while the pulse modulation type transmitting apparatus is the same as in Embodiment 1. A block diagram of a pulse modulation type receiving apparatus of Embodiment 5 of the present invention is shown in FIG. 6.

Figure 6:
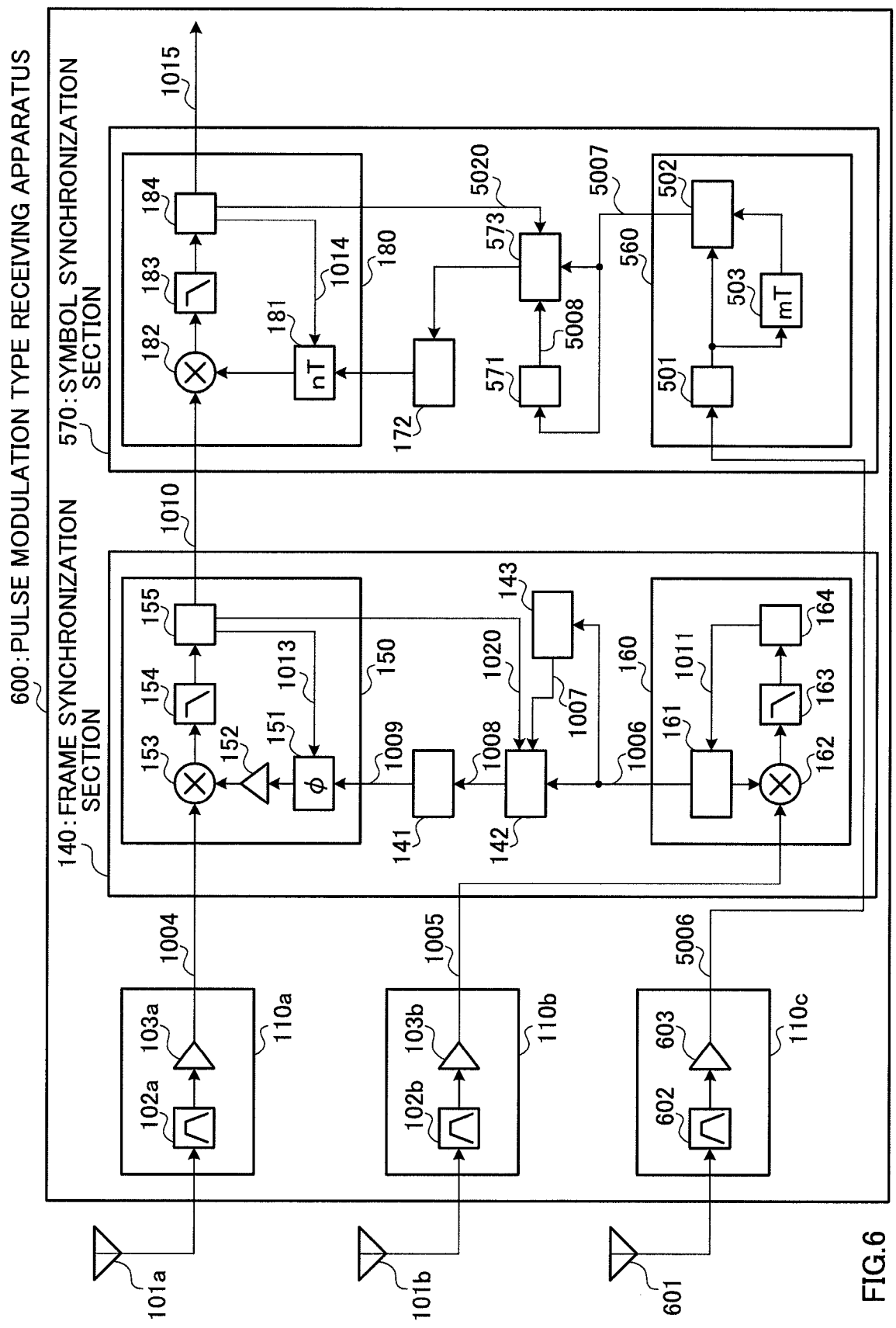
FIG. 6 is a block diagram showing the configuration of a pulse modulation type receiving apparatus according to Embodiment 5 of the present invention.

Differences in the configuration in FIG. 6 as compared with the configuration of Embodiment 4 are due to the fact that, on the pulse modulation type transmitting apparatus side, separately sent RF frame synchronization signal 1005 and RF symbol synchronization timing signal 5006 are transmitted in different frequency bands, and on the pulse modulation type receiving apparatus 600 side, RF frame synchronization signal 1005 and RF symbol synchronization timing signal 5006 are extracted and output by separate radio reception systems.

Descriptions of parts having the same configuration and operation as in a pulse modulation type transmitting apparatus and pulse modulation type receiving apparatus of Embodiment 4 of the present invention are omitted here, and only differences in configuration and operation are described.

Pulse modulation type receiving apparatus 600 in FIG. 6 differs in terms of configuration and operation from pulse modulation type receiving apparatus 500 of Embodiment 4 in that pulse modulation type receiving apparatus 600 is also connected to an antenna 601, has a receiving section 110c, extracts RF symbol synchronization timing signal 5006 from a radio signal using antenna 601, a band-pass filter 602, and an amplifier 603, and outputs the extracted signal to second symbol synchronization timing adjustment section 560 after performing low-noise amplification of the signal to a predetermined power level.

Figure 7:
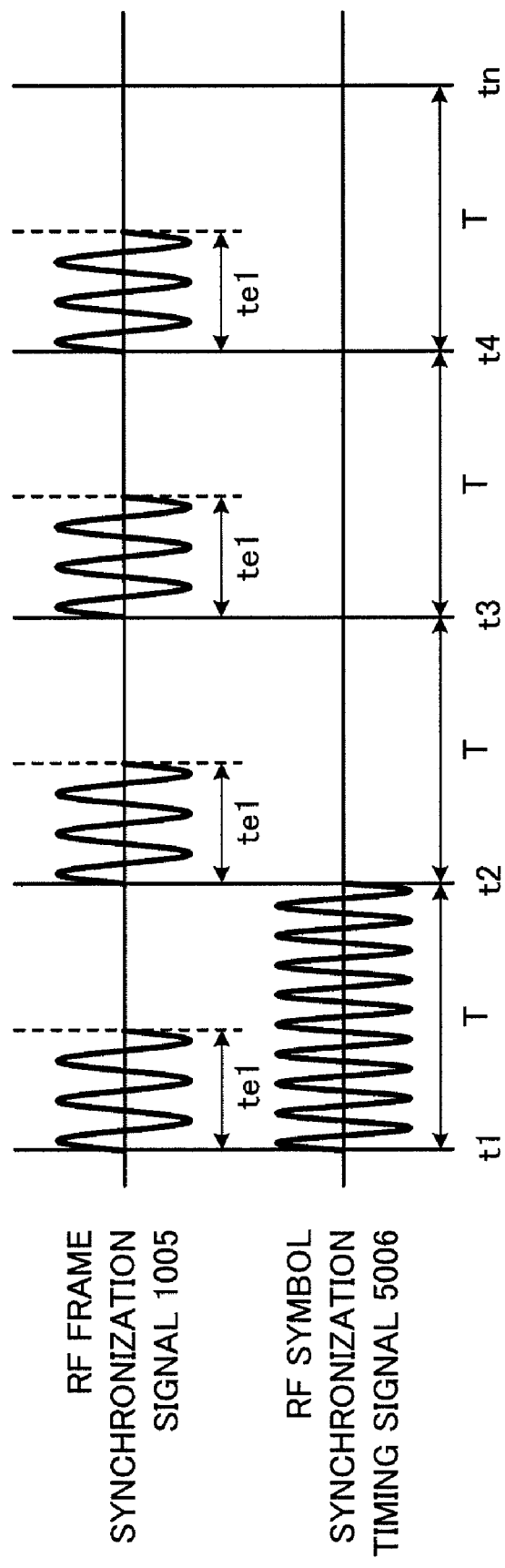
FIG. 7 is a drawing explaining an RF frame synchronization signal and an RF symbol synchronization timing signal according to Embodiment 5 of the present invention.

FIG. 7 shows separately sent RF frame synchronization signal 1005 and RF symbol synchronization timing signal 5006. RF frame synchronization signal 1005 used in synchronization establishment in which pulse acquisition and pulse phase acquisition are performed is composed of intermittently excited sine waves, of a time duration te1 identical to the pulse width of an RF data pulse composing an RF data signal, at times t1 through tn spaced at fixed intervals of time T. Pulse width te1 of transmit/receive pulses is shorter than time interval T.

Meanwhile, in symbol synchronization signal generation section 172, RF symbol synchronization timing signal 5006 used for symbol synchronization does not require intermittent sine wave excitation at all of times t1 through tn, but only excitation for a predetermined time at time t1, since symbol synchronization signal generation is performed based on signal start time t1. Also, it does not matter if the excitation time is longer than te1. In FIG. 7, excitation is performed for time T.

Therefore, a second narrow-band frequency channel, different from that for initial frame synchronization establishment, is assigned to separately sent RF symbol synchronization timing signal 5006 used for symbol synchronization.

According to such a pulse modulation type transmitting apparatus, pulse modulation type receiving apparatus, and system of Embodiment 5 of the present invention, by providing configuration elements whereby RF frame synchronization signal 1005 and RF symbol synchronization timing signal 5006 are transmitted and received by means of separate radio frequencies in addition to the configuration of Embodiment 4, mutual influence of the respective signal components is eliminated in first frame synchronization timing adjustment section 160 and second symbol synchronization timing adjustment section 560, as compared with a case in which these signals are received at the same radio frequency.

Therefore, in addition to obtaining the effects of Embodiment 4 such as reduction of the frame synchronization establishment time and symbol synchronization establishment time, a more stable frame synchronization signal and symbol synchronization timing signal can be extracted. Furthermore, a stable correlation receive data signal or restored data signal with less jitter can be obtained.

Embodiment 6

Next, a pulse modulation type transmitting apparatus and pulse modulation type receiving apparatus of Embodiment 6 of the present invention will be described. Differences from Embodiment 5 lie in both the pulse modulation type receiving apparatus and the pulse modulation type transmitting apparatus. The block configurations of a pulse modulation type transmitting apparatus and pulse modulation type receiving apparatus of Embodiment 6 of the present invention are shown in FIG. 8 and FIG. 9 respectively.

Descriptions of parts having the same configuration and operation as in a pulse modulation type transmitting apparatus and pulse modulation type receiving apparatus of Embodiment 5 of the present invention are omitted here, and only differences in configuration and operation are described.

Figure 8:
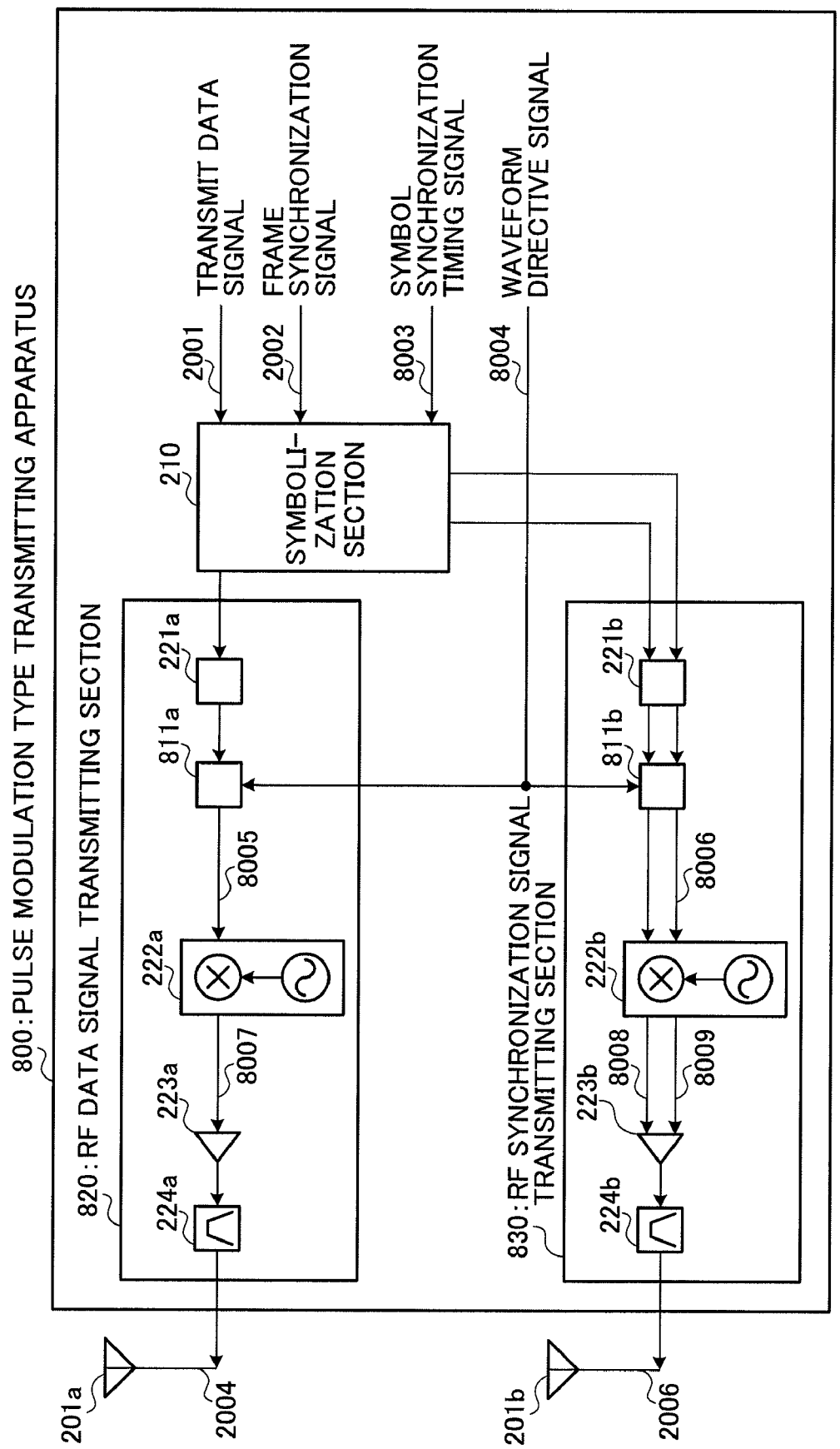
FIG. 8 is a block diagram showing the configuration of a pulse modulation type transmitting apparatus according to Embodiment 6 of the present invention.

In addition to the configuration of pulse modulation type transmitting apparatus 200, pulse modulation type transmitting apparatus 800 shown in FIG. 8 is provided with waveform selection sections 811a and 811b between modulation sections 221a and 221b and frequency conversion sections 222a and 222b.

Figure 9:
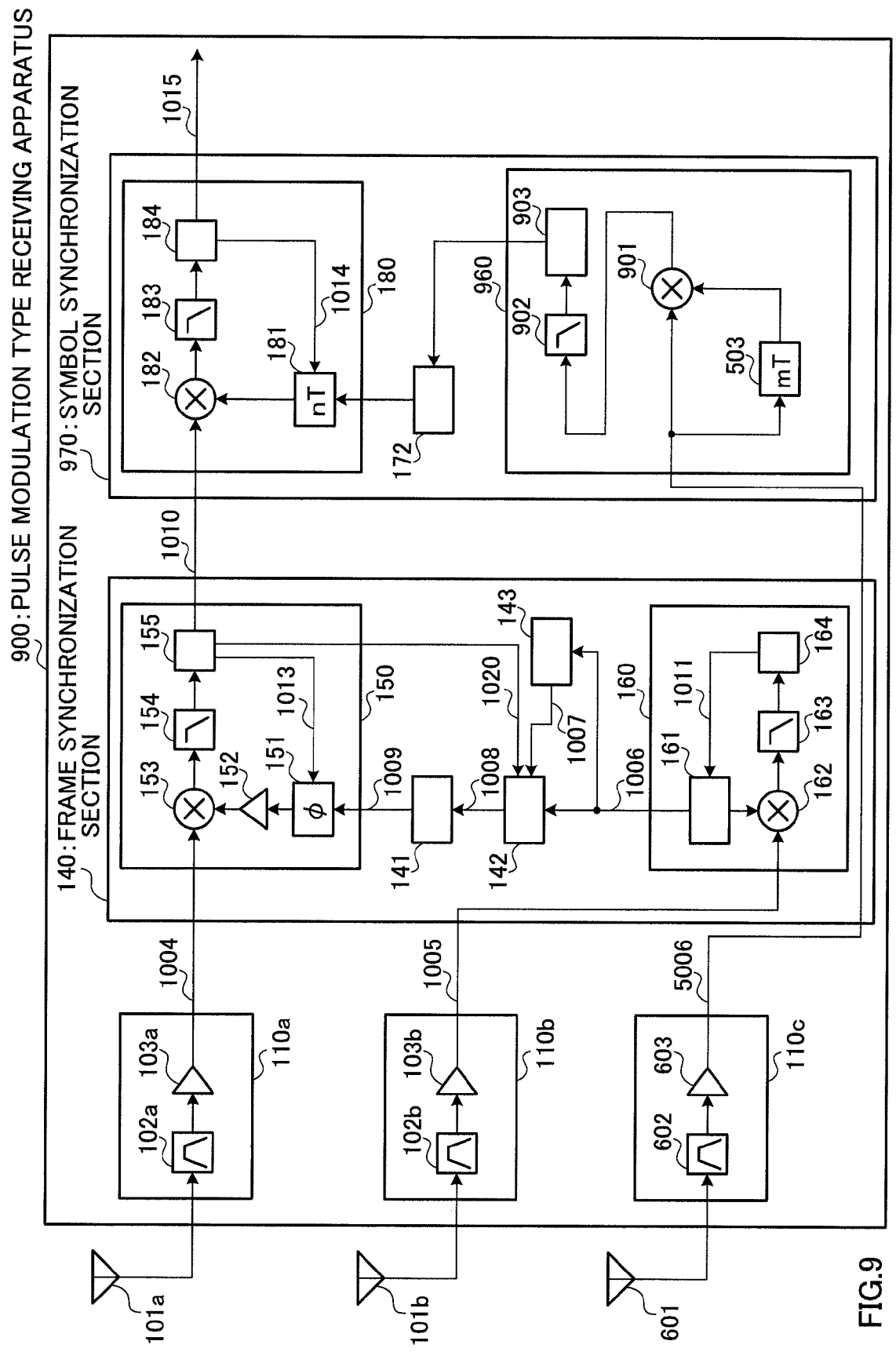
FIG. 9 is a block diagram showing the configuration of a pulse modulation type receiving apparatus according to Embodiment 6 of the present invention.

Pulse modulation type receiving apparatus 900 shown in FIG. 9 does not have clock regeneration section 571 that generates second timing or timing signal switching section 573 provided in symbol synchronization section 570 of pulse modulation type receiving apparatus 600, and does not have detection section 501 or addition/reset circuit section 502 provided in the second symbol synchronization timing adjustment section, but has a correlation section 901, a low-pass filter 902, and a correlation determination unit 903.

In FIG. 8, transmit data signal 2001 and frame synchronization signal 2002 are symbolized by symbolization section 210, and after undergoing predetermined modulation by modulation sections 221a and 221b, are assigned a wavelet having a predetermined waveform by waveform selection sections 811a and 811b, undergo frequency conversion by frequency conversion sections 222a and 222b, and are transmitted.

Meanwhile, a symbol synchronization timing signal 8003 is symbolized by symbolization section 210, and after undergoing predetermined modulation by modulation sections 221a and 221b, is assigned a wavelet having a different waveform from the transmit data or frame synchronization signal by waveform selection section 811b.

Figure 10A:
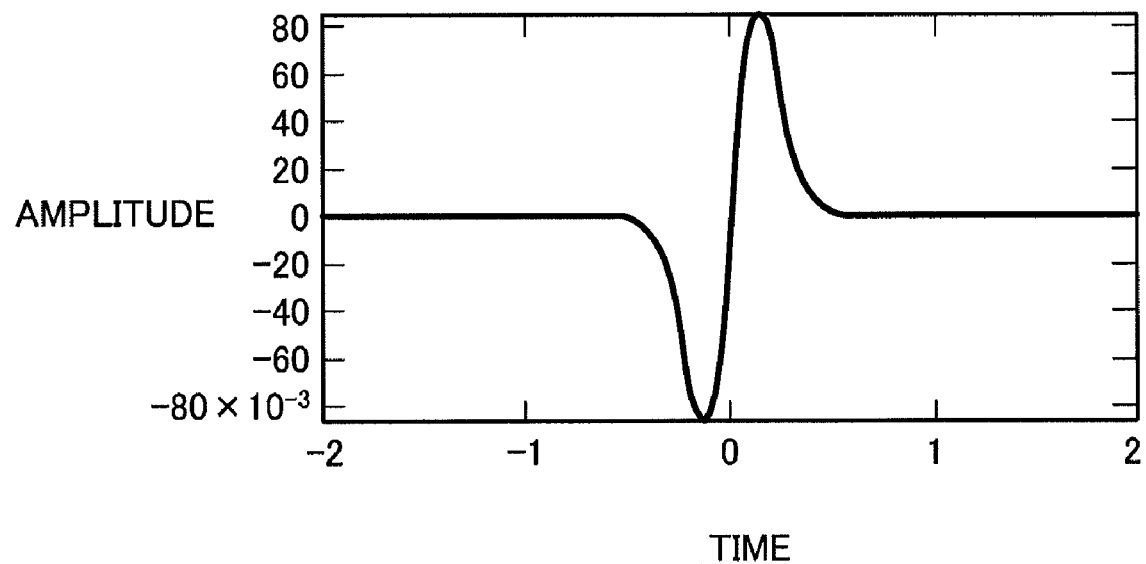
FIG. 10A is a drawing explaining a wavelet assignment waveform in a pulse modulation type transmitting apparatus according to Embodiment 6 of the present invention.
Figure 10B:
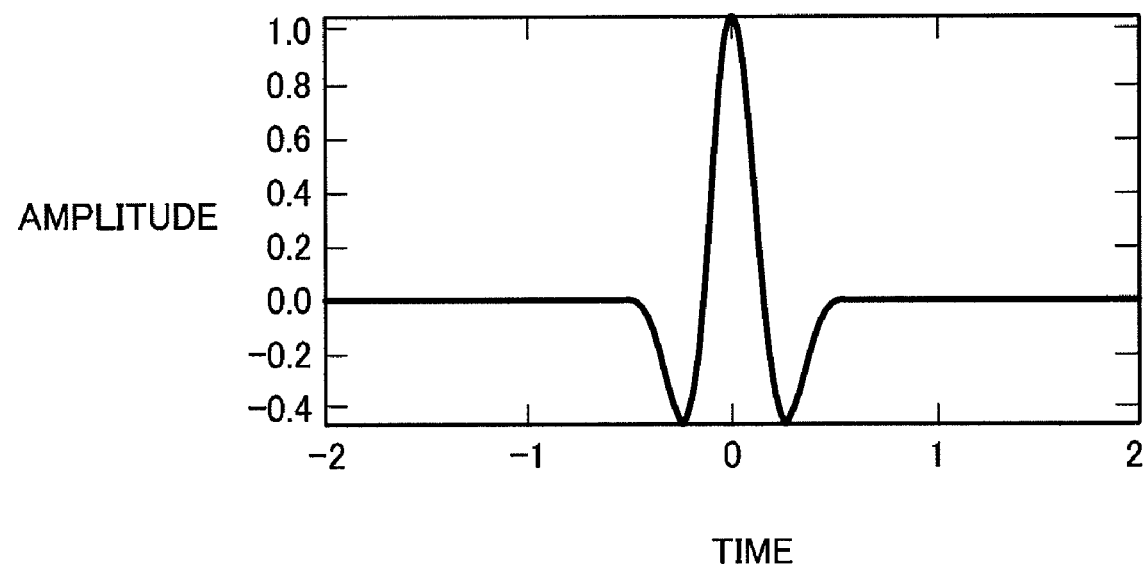
FIG. 10B is a drawing explaining a wavelet assignment waveform in a pulse modulation type transmitting apparatus according to Embodiment 6 of the present invention.

At this time, waveforms that are mutually separable on the pulse modulation type receiving apparatus 900 side are selected as the waveforms assigned to transmit data signal 2001 or frame synchronization signal 2002 and symbol synchronization timing signal 8003. FIG. 10A and FIG. 10B show the waveforms of wavelets used for transmit data signal 2001 or frame synchronization signal 2002 and symbol synchronization timing signal 8003. FIG. 10A shows a first-order differential waveform of a Gaussian impulse waveform, and FIG. 10B shows a second-order differential waveform of a Gaussian impulse waveform, with time indicated by the horizontal axis and amplitude by the vertical axis. The waveforms in FIG. 10A and FIG. 10B have a temporally mutually orthogonal relationship, and can be separated on the pulse modulation type receiving apparatus side.

Using the Gaussian impulse waveform first-order differential waveform in FIG. 10A for transmit data signal 2001 and control section 1002, and assigning the Gaussian impulse waveform second-order differential waveform in FIG. 10B to symbol synchronization timing signal 8003, is not the only method of assigning the waveforms in FIG. 10A and FIG. 10B, and the reverse may also be implemented. Also, the waveforms of the wavelets used are only examples, and wavelet waveforms other than those in FIG. 10A and FIG. 10B may be used as long as they have a temporally mutually orthogonal relationship.

Figure 11:
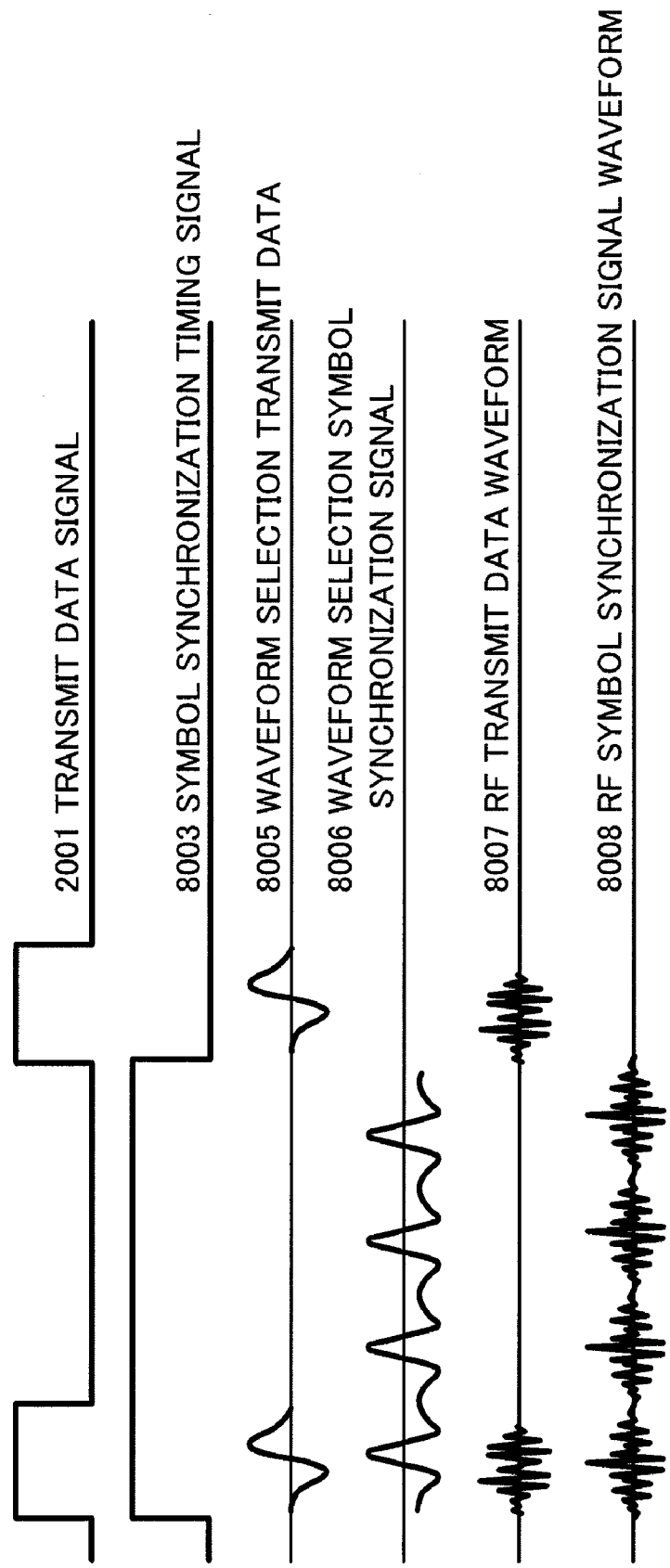
FIG. 11 is a drawing explaining various input/output signal waveforms in a pulse modulation type transmitting apparatus according to Embodiment 6 of the present invention.
Figure 12:
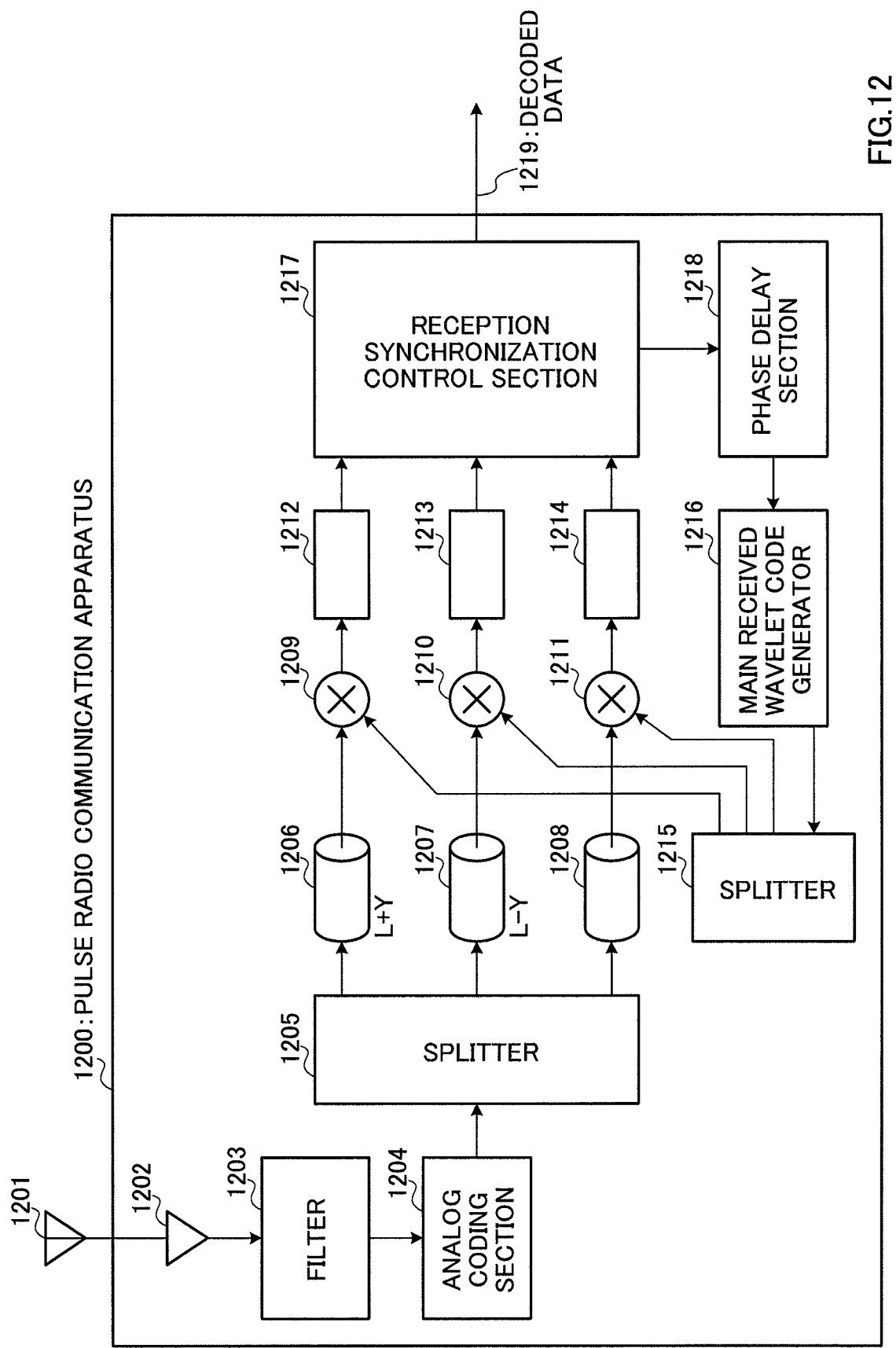
FIG. 12 is a block diagram of a conventional pulse modulation type radio communication apparatus.

If, in FIG. 8, the output signals from waveform selection sections 811a and 811b for transmit data signal 2001 and symbol synchronization timing signal 8003 are a waveform selection transmit data 8005 and waveform selection symbol synchronization signal 8006 respectively, and the frequency conversion sections 222a and 222b output signals are RF transmit data 8007 and RF symbol synchronization signal 8008 respectively, the waveforms and relationships of the input/output signals are as shown in FIG. 11. Symbol synchronization timing signal 8003 has a long pulse width relative to transmit data signal 2001.

Pulse modulation type receiving apparatus 900 shown in FIG. 9 extracts RF symbol synchronization timing signal 5006 from a radio signal using antenna 601, and band-pass filter 602 and low-noise amplifier 603 of receiving section 110c, and outputs the extracted signal to second symbol synchronization timing adjustment section 960 after performing low-noise amplification of the signal to a predetermined power level. At this time, RF frame synchronization signal 1005 having a different wavelet is eliminated by second symbol synchronization timing adjustment section 960 even if the transmission frequency band—that is, the carrier frequency—is the same.

In second symbol synchronization timing adjustment section 960, an input RF symbol synchronization timing signal is split into two, one of the two signals is delayed by time m×T (where m is an integer) by variable delay section 503 and is then input to correlation section 901 with the other signal, and delay detection is performed.

After a desired signal component is extracted by means of low-pass filter 902, the m value of variable delay section 503 is varied by correlation determination unit 903 until the correlation value reaches a predetermined value. When the correlation value reaches the predetermined value, a timing signal necessary for the desired symbol synchronization is output from correlation determination unit 903.

According to such a pulse modulation type transmitting apparatus, pulse modulation type receiving apparatus, and system of Embodiment 6 of the present invention, by making minor changes to the configuration of a pulse modulation type receiving apparatus of Embodiment 5, and providing a configuration on the pulse modulation type transmitting apparatus 800 side whereby different wavelets are implemented for RF symbol synchronization signal 8008 and an RF symbol synchronization timing signal 8009, RF symbol synchronization signal 8008 and RF symbol synchronization timing signal 8009 can be sent in the same frequency band.

Furthermore, since RF frame synchronization signal 1005 and RF symbol synchronization timing signal 5006 can easily be separated on the pulse modulation type receiving apparatus 900 side, mutual influence of the respective signal components is eliminated in first frame synchronization timing adjustment section 160 and second symbol synchronization timing adjustment section 960, as compared with a case in which different wavelets are not implemented and these signals are received at the same radio frequency, so that, in addition to obtaining the effects of Embodiment 5 such as reduction of the frame synchronization establishment time and symbol synchronization establishment time, a more stable frame synchronization signal and symbol synchronization timing signal can be extracted. Furthermore, a stable correlation receive data signal or restored data signal with less jitter can be obtained.

The present application is based on Japanese Patent Application No. 2005-140935 filed on May 13, 2005, entire content of which is expressly incorporated herein by reference.

INDUSTRIAL APPLICABILITY

A pulse modulation type transmitting apparatus, pulse modulation type receiving apparatus, and system according to the present invention have an effect of shortening the time required for synchronization establishment, enabling data exchange to be performed immediately after the start of communication, and making possible high-speed data transmission, as well as an effect of enabling low power consumption of a synchronization section to be achieved despite the use of a configuration having a plurality of reception systems, and are useful for a data communication apparatus, UWB radio apparatus, or the like, using a pulse-shaped modulated signal for configuring a seamless network by mutual radio connection of audiovisual devices and/or personal computers.

The invention claimed is:

1. A pulse modulation type transmitting apparatus comprising:
 a symbolization section that executes predetermined symbolization for transmit data, a frame synchronization signal, and a symbol synchronization timing signal, and generates symbolized transmit data, a symbolized frame synchronization signal, and a symbolized symbol synchronization timing signal;
 an RF data signal transmitting section that executes predetermined modulation on said symbolized transmit data, performs up-conversion to radio frequency, and generates an RF data signal having a first RF input signal that is input to a frame synchronization section of a communicating party; and
 an RF synchronization signal transmitting section that executes predetermined modulation on said symbolized frame synchronization signal, performs up-conversion to radio frequency, and generates an RF frame synchronization signal having a second RF input signal that is input to a frame synchronization section of a communicating party, and executes predetermined modulation on said symbolized symbol synchronization timing signal, performs up-conversion to radio frequency, and generates an RF symbol synchronization timing signal that is input to a symbol synchronization section of a communicating party.

2. The pulse modulation type transmitting apparatus according to claim 1, wherein said RF synchronization signal transmitting section sends said RF symbol synchronization timing signal in a different frequency band from said RF frame synchronization signal.

3. The pulse modulation type transmitting apparatus according to claim 1, wherein said RF synchronization signal transmitting section sends said RF frame synchronization maintenance signal and said RF symbol synchronization timing maintenance signal at a previously defined time interval.

4. The pulse modulation type transmitting apparatus according to claim 1, wherein said RF data signal transmitting section and said RF synchronization signal transmitting section further comprise a waveform selection section that assigns wavelets having mutually separable signal waveforms to said RF data signal, said RF frame synchronization signal, said RF symbol synchronization timing signal, said RF frame synchronization maintenance signal, and said RF symbol synchronization timing maintenance signal.

5. The pulse modulation type transmitting apparatus according to claim 1, wherein said waveform selection section uses different wavelets for one or more signals among said RF frame synchronization signal, said RF symbol synchronization timing signal, said RF frame synchronization maintenance signal, and said RF symbol synchronization timing maintenance signal.

6. The pulse modulation type transmitting apparatus according to claim 1, wherein said RF frame synchronization signal includes data for device authentication.

7. The pulse modulation type transmitting apparatus according to claim 1, wherein data rates of at least two of said RF data signal, said RF frame synchronization signal, and said RF symbol synchronization timing signal differ.

8. The pulse modulation type transmitting apparatus according to claim 1, wherein said RF data signal transmitting section and said RF synchronization signal transmitting section transmit at least one of said RF data signal, said RF frame synchronization signal, and said RF symbol synchronization timing signal.

* * * * *